United States Patent
Maganas et al.

(10) Patent No.: US 6,962,681 B2
(45) Date of Patent: *Nov. 8, 2005

(54) METHODS AND SYSTEMS FOR REDUCING OR ELIMINATING THE PRODUCTION OF POLLUTANTS DURING COMBUSTION OF CARBON-CONTAINING FUELS

(75) Inventors: Thomas C. Maganas, Manhattan Beach, CA (US); Alan L. Harrington, Roseville, CA (US)

(73) Assignee: Maganas Oh Radicals, Inc., Manhattan Beach, CA (US)

( * ) Notice: Subject to any disclaimer, the term of this patent is extended or adjusted under 35 U.S.C. 154(b) by 357 days.

This patent is subject to a terminal disclaimer.

(21) Appl. No.: 10/218,377

(22) Filed: Aug. 13, 2002

(65) Prior Publication Data

US 2003/0010024 A1 Jan. 16, 2003

Related U.S. Application Data

(63) Continuation-in-part of application No. 09/859,905, filed on May 17, 2001, now Pat. No. 6,520,287, which is a continuation-in-part of application No. 09/307,145, filed on May 7, 1999, now Pat. No. 6,235,247, which is a continuation-in-part of application No. 08/985,339, filed on Dec. 4, 1997, now Pat. No. 5,928,618, and a continuation-in-part of application No. 09/257,458, filed on Feb. 28, 1999, now abandoned, application No. 09/859,905, which is a continuation-in-part of application No. 09/778,418, filed on Feb. 7, 2001, now Pat. No. 6,457,552.
(60) Provisional application No. 60/183,088, filed on Feb. 15, 2000.

(51) Int. Cl.$^7$ .............................. B01D 53/34; B01J 8/00; C01B 31/00; C10K 1/00; C10K 3/00
(52) U.S. Cl. ................ 423/245.3; 423/212; 423/247
(58) Field of Search .................. 423/212, 245.3, 423/247

(56) References Cited

U.S. PATENT DOCUMENTS

| | | | |
|---|---|---|---|
| 2,956,865 A | 10/1960 | Williams | 23/284 |
| 3,632,304 A | 1/1972 | Hardison | 23/2 S |
| 3,714,071 A | 1/1973 | Michalko | 502/8 |

(Continued)

FOREIGN PATENT DOCUMENTS

| | | | |
|---|---|---|---|
| EP | 0 176 123 A1 | 4/1986 | |
| EP | 0 605 719 A1 | 7/1994 | B01D/53/36 |

(Continued)

OTHER PUBLICATIONS

Agarwal, Kedar, *Pyrolysis of Polymer Waste*, pp. 232–245, Society of Plastic Engineers, "Plastics Recycling: Technology Charts the Course," (Nov. 4, 1994).

(Continued)

*Primary Examiner*—Stanley S. Silverman
*Assistant Examiner*—Jonas N. Strickland
(74) *Attorney, Agent, or Firm*—Workman Nydegger

(57) ABSTRACT

Systems and apparatus for increasing combustion efficiency during combustion of a carbon-containing fuel such as a fossil fuel. The systems and apparatus utilize catalytically reactive particles within a reaction chamber, typically silica or alumina, that interact with waste exhaust gases produced during combustion of the fuel in order to produce a degrading atmosphere of hydroxy radicals or other reactive species. The degrading atmosphere apparently migrates to the source of combustion and increases the efficiency of combustion as evidenced by the reduction or elimination of soot and other pollutants normally produced. Typically, the reaction chamber is maintained at a temperature in a range from about 30° C. to about 600° C. Moisture is provided by the waste exhaust gases in order to catalyze formation of hydroxyl radicals by the catalytically reactive particles. The systems and apparatus can be adapted to be used in combination with diesel engines or other internal combustion engines and industrial burners. Such systems also reduce nitrogen oxides ($NO_x$), $SO_2$ and $CO_2$ typically found in exhaust gases.

31 Claims, 7 Drawing Sheets

U.S. PATENT DOCUMENTS

| | | | |
|---|---|---|---|
| 3,841,242 A | 10/1974 | Sigg | 110/257 |
| 3,915,890 A | 10/1975 | Soldate | 252/411 |
| 3,922,975 A | 12/1975 | Reese | 110/8 F |
| 4,052,173 A | 10/1977 | Schultz | 48/202 |
| 4,308,806 A | 1/1982 | Uemura et al. | 110/244 |
| 4,330,513 A | 5/1982 | Hunter et al. | 423/245 |
| 4,497,637 A | 2/1985 | Purdy et al. | 48/111 |
| 4,623,400 A | 11/1986 | Japka et al. | 148/283 |
| 4,701,312 A | 10/1987 | Kice | 423/213.7 |
| 4,708,067 A | 11/1987 | Narisoko et al. | 110/245 |
| 4,724,776 A | 2/1988 | Foresto | 110/235 |
| 4,761,270 A | 8/1988 | Turchan | 423/235 |
| 4,886,001 A | 12/1989 | Chang et al. | 110/346 |
| 4,974,531 A | 12/1990 | Korenberg | 110/346 |
| 4,977,840 A | 12/1990 | Summers | 110/346 |
| 4,991,521 A | 2/1991 | Green et al. | 110/347 |
| 5,010,830 A | 4/1991 | Asuka et al. | 110/347 |
| 5,178,101 A | 1/1993 | Bell | 122/4 D |
| 5,181,795 A | 1/1993 | Circeo, Jr. et al. | 405/128 |
| 5,207,734 A * | 5/1993 | Day et al. | 60/278 |
| 5,335,609 A | 8/1994 | Nelson et al. | 110/346 |
| 5,347,936 A | 9/1994 | Thorhuus | 110/260 |
| 5,676,070 A | 10/1997 | Maganas et al. | 110/245 |
| 5,928,618 A | 7/1999 | Maganas et al. | 423/212 |

FOREIGN PATENT DOCUMENTS

| | | | | |
|---|---|---|---|---|
| FR | 2687785 A1 | 2/1992 | | |
| FR | 2701223 A1 | 8/1994 | | |
| GB | 541962 | 12/1941 | | |
| JP | 55-24597 | 2/1980 | | |
| JP | 358095192 A * | 6/1983 | | F28D/13/00 |
| JP | 5-115752 | 5/1993 | | |
| JP | WO 93/24207 | 12/1993 | | |

OTHER PUBLICATIONS

Biozone Scientific, *Hydroxyls: Powerful air Purification*, www.extrapureair.com, pp. 1–3 (Jun. 19, 2002).

Combustion Research Facility News, *Raman probe validates oxidation model in supercritical water*, Sandia National Laboratories, vol. 17, No. 5 (Sep./Oct. 1995).

Conversion Technology, Inc., *Source Test Report: Fluid Bed Stripping For Particulates, Metals, POHCS*, (1991).

Durham et al., *Carbothermal Synthesis of Silicon Nitride: Effect of Reaction Conditions*, 31–37, 211, 213–215, J. Am. Ceram. Soc., vol. 74 [1] (1991).

Guedes De Carvalho et al., *Mass Transfer Around Carbon Particles Burning In Fluidised Beds*, 63–70, Trans. IChemE., vol. 69, Part A (1991).

Homsy et al., *Report Of A Symposium On Mechanics Of Fluidized Beds*, 477–495, J. Fluid Mech., vol. 236 (1992).

Hydroxyl Radical Source, *The Hydroxyl Radical; Sources and Measurement*, www.chem.leeds.ac.uk, p. 1 of 2, (Jun. 24, 2002).

Jean et al., *Fluidization Behavior Of Polymeric Particles In Gas–Solid Fluidized Beds*, 325–335, Chemical Engineering Science, vol. 47, No. 2 (1992).

Kuipers et al., *A Numerical Model Of Gas–Fluidized Beds*, 1913–1924, Chemical Engineering Science, vol. 47, No. 8 (1992).

Marrone, Philip A., *Supercritical Water Oxidation*, web.mit.edu, p. 1 of 1, (Jun. 24, 2002).

Molerus, O., *Heat Transfer In Gas Fluidized Beds, Part 1*, 1–14, Powder Technology, 70 (1992).

Scientific American, *Paving Out Pollution*, 2 pgs., www.sciam.com (Jun. 24, 2002).

Schafey et al., *Experimental Study On A Bench–Scale, Batch–Type Fluidized–Bed Combustor For Energy Production From Waste–Derived Fuels*, 331–338, Energy, vol. 17, No. 4 (1992).

Seghers Engineering, *Segers Zerofuel: A Concept For Autothermal Sludge Incineration* (1992).

* cited by examiner

METHODS AND SYSTEMS FOR REDUCING OR ELIMINATING THE PRODUCTION OF POLLUTANTS DURING COMBUSTION OF CARBON-CONTAINING FUELS

RELATED APPLICATIONS

This application is a continuation-in-part of U.S. application Ser. No. 09/859,905, filed May 17, 2001, now issued U.S. Pat. No. 6,520,287, which is a continuation-in-part of U.S. application Ser. No. 09/307,145, filed May 7, 1999, now issued U.S. Pat. No. 6,235,247, which is a continuation-in-part of U.S. application Ser. No. 08/985,339, filed Dec. 4, 1997, now issued U.S. Pat. No. 5,928,618, and a continuation-in-part of U.S. application Ser. No. 09/257,458, filed Feb. 25, 1999, now abandoned. U.S. application Ser. No. 09/859,905 is also a continuation-in-part of U.S. application Ser. No. 09/778,418, filed Feb. 7, 2001 now U.S. Pat. No. 6,457,552, which claims the benefit under 35 U.S.C. § 119 of U.S. provisional application No. 60/183,088, filed Feb. 15, 2000. For purposes of disclosure, the foregoing patents and applications are incorporated herein by reference.

BACKGROUND OF THE INVENTION

1. Field of the Invention

The invention is in the field of pollution control and combustion efficiency relating to the combustion of carbon-containing fuels. More particularly, the present invention is in the field of increasing combustion efficiency in order to eliminate or reduce the quantity of combustion products like soot, hydrocarbons, carbon monoxide and other pollutants that are otherwise produced by internal combustion engines, such as diesel engines, and industrial burners, such as those that burn coal, fuel oil or other carbon-containing fuels.

2. Review of the Relevant Technologies

Modern society has mastered the art of producing new goods but struggles to dispose of its wastes. One problem associated with the modern economy involves pollutants that are produced by burning carbon-containing fuels, mainly fossil fuels, such as by internal combustion engines and industrial burners. The incomplete combustion of carbon-containing fuels such as gasoline, diesel fuel, fuel oil, coal, wood, biomass and even natural gas can result in the generation of pollutants such as carbon particulates, hydrocarbons, soot, oily substances, carbon monoxide (CO) and other pollutants. Such pollutants collect in the atmosphere and can cause all manner of health problems and smog. In response to the build-up of atmospheric pollution governments have attempted to legislate strict controls on the output of pollution generated by carbon-containing fuels.

In response to pollution caused by gasoline-powered internal combustion engines, catalytic converters have been developed and mandated to reduce the levels of incomplete combustion pollutants emitted into the environment by gasoline-powered vehicles. Catalytic converters are typically positioned in-line with the exhaust and muffling system of an internal combustion engine and are generally able to catalytically convert most of the unburnt hydrocarbons and CO into $CO_2$ and water. Conventional catalytic converters contain palladium or platinum, which are coated on top of carrier beads or pellets made of inert and heat-resistant materials such as ceramics in order to increase the surface area of the active catalyst and keep them from simply blowing out the exhaust pipe.

Although modern catalytic converters can be used to convert unburnt hydrocarbons and CO into carbon dioxide ($CO_2$) and water, they are generally only feasible for use with relatively clean burning systems such as gasoline-powered vehicles. They generally are not suitable for use with diesel engines. Because of the nature of diesel engines, both in terms of the fuel that is burned, as well as the way in which the fuel is burned, diesel engines produce substantial quantities of soot and other unburnt hydrocarbons which are too plentiful to be efficiently converted into $CO_2$ and water using reasonably sized and priced catalytic converters known in the art. As a result, researchers have struggled for years to find an effective and economical way to remove pollutants from the exhaust stream of diesel engines.

More recently, public concern has translated into increased political pressure to strengthen emission standards for diesel engines. There is a possibility that emission guidelines will be imposed in certain states that may be difficult, if not impossible, to meet in an economically feasible manner. As a result, there is an acute need to develop improved diesel engines that are able to run more efficiently and produce less pollution that must otherwise be removed from the waste exhaust stream.

Besides diesel engines, researchers have struggled to find ways to effectively and economically address the tremendous quantity of pollutants generated by industrial burners, such as those that burn coal, fuel oil, or natural gas. In response to pollution controls directed to industrial burners, sophisticated scrubbers and after burners have been developed in attempts to satisfy such pollution standards. However, these and other pollution reduction means can be quite expensive, both in retrofitting older industrial burners as well as in the fabrication of new ones.

Even assuming one could construct a perfectly effective catalytic converter for carbonaceous particulates, hydrocarbons and CO, the end result would still be the generation of equal or greater amounts of $CO_2$ compared to what is presently being generated. Although inert and non-polluting, $CO_2$ is still of concern to environmentalists due to the fear that the buildup of excessive amounts of $CO_2$ in the atmosphere has resulted in detectable global warming, although a minority of scientists remain skeptical, and will eventually result in catastrophic climatic changes if the world continues to generate $CO_2$ in high quantities. Since there does not appear to be any end in sight of the need to burn fossil fuels, the concentration of $CO_2$ will invariably continue to increase indefinitely.

In view of the foregoing, it would be an advancement in the art to provide methods and systems that could effectively and inexpensively eliminate, or at least substantially reduce, the quantity of unburnt or partially burnt combustion products produced by diesel engines and other internal combustion engines in an economically feasible manner.

SUMMARY AND OBJECTS OF THE INVENTION

The present invention relates to methods and systems for eliminating or reducing the amount of incomplete combustion products produced during the combustion of carbon-containing fuels. More particularly, the invention encompasses methods and systems that create a highly reactive combustion environment (or degrading atmosphere) that eliminates or reduces the initial formation of soot, unburnt hydrocarbons and other pollutants at or near the source of combustion. The highly reactive environment has been found to be amazingly effective in eliminating at least a portion of carbon particulates, soot, hydrocarbons, CO, oily substances, other unburnt organic materials, and other pollutants that would otherwise be produced during the combustion of carbon-containing fuels. The inventive methods and systems are especially useful for the elimination or reduction in the formation of incomplete combustion products produced by diesel and other internal combustion engines and industrial burners, such as coal or fuel oil fired power plants, metal smelters and the like.

This highly reactive degrading atmosphere is generated by the interaction of a heated waste gas stream generated during combustion of carbon-containing fuels, including moisture, carbon dioxide, oxygen, and possibly other gaseous or fine particulate materials, with a bed of a silica and/or alumina particles that catalyze the formation of highly reactive hydroxyls or other reactive species. Such reactive species, through mechanisms not entirely understood, have been found to cause the fuel to burn more cleanly in the first instance, thereby reducing the amount of pollutants that would otherwise be formed. Silica particles, while conventionally believed to be inert, have been found to be capable of generating huge quantities of highly reactive hydroxyl radicals or other highly reactive molecular fragments or moieties at or near their surface under certain conditions to be discussed herein. These hydroxyl radicals or other highly reactive moieties are apparently highly labile (and possibly heat-seeking) such that they are surprisingly and unexpectedly able to increase the efficiency of combustion of carbon-containing fuels within the cylinders. As described more fully below, the apparatus and methods according to the invention yield the surprising and unexpected result of virtually eliminating the formation of soot and other incomplete combustion products that would otherwise be formed during combustion.

It is proposed that the hydroxyl radicals, when exposed to the hydrocarbon fuel at high temperature and pressure within the confines of the combustion cylinders, form supercritical water. It is believed that the hydroxyl radicals, supercritical water, or both cause the fuel to burn more efficiently so that soot, oily substances and other common byproducts of such composition are greatly reduced or eliminated.

Although the technology of providing a fluidized bed of inert silica and alumina to assist in the pyrolysis or cracking of certain organic materials is well-known, it was heretofore unknown that such particles could also generate a degrading atmosphere of hydroxyl radicals under certain conditions. Instead, such particles were used mainly to distribute heat throughout the fluidized bed to provide more uniform heating action. While it is true that at temperatures high enough to effect pyrolysis silica and alumina act as largely inert substances, it has now been discovered that silica and possibly alumina are able, at temperatures ranging from as low as perhaps 30° C. up to perhaps 600° C., and in the presence of moisture, to generate a highly reactive atmosphere containing highly reactive hydroxyl radicals and, perhaps, other highly reactive molecular fragments or moieties, that are able to at least partially degrade organic materials, including the incomplete combustion products of carbon-containing fuels, e.g., soot, unburnt hydrocarbons, CO and other incomplete combustion products, at temperatures far below their respective combustion temperatures.

Most surprisingly, the exhaust valve ports and valve chamber of a 1981 3406A diesel engine having about 900,000 miles made by Caterpillar, Inc., which would normally be covered with large soot deposits, and which prior to being connected to an embodiment of the inventive systems did in fact contain caked on soot, was completely devoid of soot after running at high load on a test apparatus for the equivalent of thousands of road miles while connected to an apparatus according to the invention. One explanation is that hydroxyls or other reactive moieties in the degrading atmosphere produced by the bed of silica were somehow able to migrate upstream and beyond to the exhaust valve ports and into the cylinders, where they eliminated the existing soot and also prevented or greatly reduced the formation of new soot and other pollutants during combustion. Thus, the reactive moieties were both remedial and prophylactic (i.e., they reduced existing soot buildups and they caused the diesel fuel to also burn so efficiently so as to eliminate or greatly reduce the formation of soot in the first instance). Even an expert in diesel engines was reportedly surprised as to how the old diesel engine sounded and ran and how clean the exhaust valve ports and valve chamber were.

In general, the silica and/or alumina particles are simply exposed to the waste exhaust stream produced by the combustion of a carbon-containing fuel in order to generate the degrading atmosphere. The waste exhaust stream may optionally be pressurized by a pressurizing apparatus and/or blended with pressurized and/or heated auxiliary gases prior to being introduced in the bed of silica and/or alumina particles. As the gases are introduced into the bed of particles, at least some of the particles in the region of the moving gases may become temporarily or statically fluidized or otherwise separated against the force of gravity by means of the gases flowing through the particles. Although not required, such fluidization, if only existing locally near a hole or port, may increase the active surface area of the silica and/or alumina particles. The waste exhaust stream and/or auxiliary gases may be pressurized by any gas pressurizing means known in the art, e.g., turbines, fans, pumps, or inherent pressure generated by internal combustion engines or industrial burners.

As stated above, it appears that hydroxyl radicals or other reactive species can be generated at relatively low temperatures, perhaps as low as about 30° C. and up to about 600° C. by passing waste exhaust gases through a reaction chamber containing silica and/or alumina particles. The reaction chamber containing is preferably heated and maintained at temperatures in a range of about 50° C. to about 500° C., more preferably in a range of about 75° C. to about 450° C., and most preferably in a range of about 100° C. to about 400° C. Such temperatures are preferred in view of their being generally within the temperature range of exhaust gases generated by internal combustion engines after passing through the exhaust system. They may also be compatible with the temperature of industrial burners depending on how the gases are processed and routed. Although such temperatures are preferred, the elimination or reduction in the formation of soot, hydrocarbons, CO and other incomplete combustion products of carbon-containing fuels by means of hydroxyl radicals and other reactive species generated by silica, alumina and the like at any temperature would be within the scope of the invention.

The heat necessary to maintain the reaction chamber within the desired temperature range can be provided by any source. In a preferred embodiment, the heat will be provided substantially, or even exclusively, by the waste exhaust gases themselves. Nevertheless, it is certainly within the scope of the invention to supplement the heat found in exhaust gases by means of electric heaters, burning fuels such as methane gas, by recycling heat recovered from other sources, or by any other heat source that is able to provide a desired quantity of heat in order to maintain the reaction chamber within a desired temperature range. For example, at initial startup of a diesel engine the exhaust gases generated by the diesel engine may be too cold to adequately heat the reaction chamber. In such cases it may be desirable to provide supplemental heating in order to raise and then maintain the temperature in order to ensure efficient degradation of soot, hydrocarbons and other incomplete combustion products.

The apparatus may optionally include means for introducing a variety of gases within the reaction chamber, such water vapor, oxygen, ammonia, etc. One such means for introducing gases is the diffusion pipe or pipes used to introduce the incomplete combustion products into the reaction chamber. Another might be a separate port feeding into the reaction chamber.

In one embodiment, the means for introducing the waste exhaust gases into the bed of silica and/or alumina particles comprise one or more diffusion pipes containing one or more spaced-apart diffusion holes submerged beneath or within the bed of silica and/or alumina particles. The diffusion pipes are, in turn, connected to one or more conduits or pathways that are in gaseous communication with the exhaust manifold of an internal combustion engine or a waste gas outlet of an industrial burner. The conduits are advantageously made of metal, which may possibly assist in the transmigration of the reactive species comprising the highly reactive environment from the bed of silica and/or alumina particles to the location of combustion where they perform their remarkable work. Alternatively, the conduits may comprise plastic or rubber conduits, possibly conduits that are reinforced by metal. The diffusion pipes and one or more conduits or pathways may optionally comprise means for maintaining the temperature of the reaction chamber containing the bed of silica and/or alumina particles at the desired level and/or introducing exhaust gases to be treated and/or introducing auxiliary gases into the reaction chamber (e.g., oxygen or moisture).

In many cases it may not be necessary to enrich the reaction chamber with water vapor since exhaust gases typically contain abundant water vapor as a result of the combustion of the hydrogen portion of hydrocarbon fuels. Sensors can be placed within the reaction chamber in order to regulate the inputs of water vapor, oxygen, heat, etc.

Because of the simplicity of the apparatus and processes used to carry out the reaction process, it is possible to greatly upscale or downscale the reaction apparatus and process to accommodate a wide variety of uses and applications. The reaction chambers may be very large or utilized in series in order to serve large industrial needs such as coal or petroleum fired power plants, smelters and the like. Alternatively, they may be downsized and adapted for use in catalytically treating exhaust gases produced by internal combustion engines, e.g., diesel-, gasoline-, and propane-powered engines.

Exhaust gases from the burning of carbon-containing fuels typically comprises incomplete combustion products, which may include carbon soot, gaseous, liquid or particulate hydrocarbons, carbon monoxide, and diatomic hydrogen, among other compounds. Actual laboratory testing has shown that passing waste exhaust gases produced by a diesel engine through a reaction chamber containing silica particles greatly reduces both the level of soot produced by the combustion of diesel fuel as well as carbon monoxide. And this reduction is now believed to occur at the source of combustion rather than downstream within the reaction chamber, or between the reaction chamber and combustion chamber, as was previously thought. In other words, the reduction in soot and other incomplete combustion products or other pollutants is believed to occur during rather than after combustion.

Carbon-containing fuels, if burned completely efficiently, mainly yield $CO_2$ or a mixture of $CO_2$ and water. Combustion at high temperatures can also yield nitrogen oxides (NOx) as a byproduct. Another surprising and unexpected result of the systems and methods according to the invention is the discovery that there is a dramatic decrease in the concentration of $CO_2$ that is found in the waste exhaust stream as well as a dramatic increase in the oxygen and water content of the exhaust stream. Although not entirely understand, it may be that the carbon monoxide and/or carbon dioxide may actually react with silica to yield silicon carbide, together with the concomitant release of oxygen. Through mechanisms not altogether understood, it is believed that supercritical water may be formed within the highly reactive atmosphere and play a role in the elimination or reduction of pollutants.

In addition, nitrogen oxides (NOx) have apparently been reduced by about 90%, possibly to anhydrous nitric acid, nitrogen gas, or even silicon nitride in a modified, catalyzed carbothermal reaction that may involve one or more of particulate carbon, hydrocarbons, CO or $CO_2$. The inventors have not ruled out other possible reaction sequences that seem to be consuming the $CO_2$, including the action of supercritical water and/or the hydroxyl or other highly reactive moieties within the labile reactive atmosphere. It is believed that the methods and systems are able to at least partially eliminate sulfur dioxide.

These and other features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a particular description of the invention briefly described above will be rendered by reference to a specific embodiment thereof which is illustrated in the appended drawings. Understanding that these drawings depict only a typical embodiment of the invention and are not therefore to be considered limiting of its scope, the invention will be described and explained with additional specificity in detail to the use of the accompanying drawings in which.

DETAILED DESCRIPTION OF THE PREFERRED EMBODIMENTS

Figure 1:
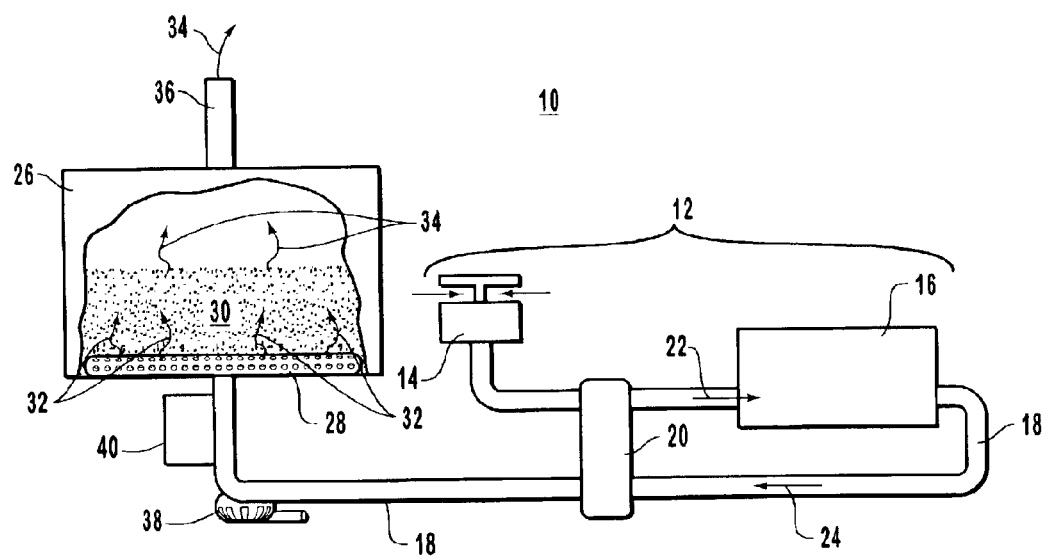
FIG. 1 is a cross-section view of an exemplary reaction chamber used in combination with a diesel engine for cleaning incomplete combustion products formed by the combustion of diesel fuel.

I. Introduction and Definitions.

The present invention relates to methods and systems for at least partially eliminating incomplete combustion products produced by the burning of carbon-containing fuels. The methods and systems are believed to generate hydroxyl radicals, and possibly other highly reactive molecular fragments or species, that are able to cause the more complete combustion of carbon-containing fuels in order to reduce or eliminate incomplete combustion products. Such methods and systems may be used, for example, in the elimination or reduction of incomplete combustion products produced by internal combustion engines, such as diesel engines, and industrial burners, such as power plants, metallurgical smelters and the like. Moreover, the methods and systems have yielded the surprising and counter-intuitive result of reducing the output of carbon dioxide, while apparently also increasing the content of water and oxygen in the exhaust stream.

In a preferred embodiment, the invention relates to improved methods and systems for eliminating or reducing incomplete combustion products normally found in exhaust gases generated by the burning of carbon-containing fuels (e.g., fossil fuels) by internal combustion engines and industrial burners. Such methods and systems are especially useful in eliminating or reducing the incomplete combustion products normally produced by diesel engines. The waste combustion products (e.g., gases) are passed through a reaction chamber containing a bed or layer of silica and/or alumina particles. Such particles may sometimes be in an at least partially or localized suspended or fluidized state as result of the input of waste exhaust gases. Through mechanisms which are not entirely understood it has been found that a fluidized bed of silica, without any special catalysts added thereto, is somehow able to eliminate the vast majority of carbonaceous soot, unburnt hydrocarbons and carbon monoxide normally found in the exhaust stream formed by burning carbon-containing fuels. Alumina is also believed to work in treating incomplete combustion products, although silica is preferred.

The terms "degrade" or "degradation", as used in the specification and the appended claims, refer to the breakdown of larger organic molecules within the organic waste material into smaller organic molecules, presumably through the catalytic cleavage of carbon-carbon bonds. These terms shall also refer to the cleavage of any other molecular bonds during the process of gasifying and oxidizing. The terms also include the complete oxidation of organic gases or particulates into carbon dioxide, water, and/or other oxidation products. It also includes any reaction in which CO, $CO_2$, carbon or hydrocarbons are converted into other, less polluting substances.

In some respects, the terms "clean" and "cleaning" may be synonymous with the terms "degrade" or "degradation" but shall also include any process by which a more polluting substance is converted into a less polluting product. Thus, "clean" and "cleaning" shall refer to any measurable reduction of unburnt hydrocarbons, particulate carbon, soot, oily substances, and like, as well as any conversion of gases such as CO, $CO_2$, $NO_x$ and $SO_2$ into less polluting substances. While $CO_2$ is not a "pollutant" in the same manner as CO, $NO_x$, $SO_2$ and incomplete combustion products of carbon-containing fuels, it is believed to be a green house gas that may contribute to global warming. Thus, any reduction in the concentration of $CO_2$ in an exhaust stream, whether or not oxygen is produced, shall constitute "cleaning".

The terms "highly reactive environment" and "degrading atmosphere" shall refer to the condition within the reaction chamber, and surrounding areas, conduits, and combustion chambers in communication with the reaction chamber that include high enough concentrations of highly reactive hydroxyl radicals, supercritical water and/or other reactive molecular fragments, free radicals or species capable of degrading and cleaning a waste exhaust stream generated by the burning of a carbon-containing fuel.

The terms "activate" and "activated" shall refer a condition in which silica and/or alumina particles are able to produce a "degrading atmosphere" capable of degrading and cleaning a waste exhaust stream generated by the burning of a carbon-containing fuel. "Activation" of silica has been shown to occur at various temperatures below about 500° C., and as low as about 30° C., in the presence of waste exhaust gases produced by the combustion of diesel fuel in an internal combustion engine.

The term "incomplete combustion products", as used in the specification and the appended claims, shall refer to incompletely oxidized reaction products that are formed during combustion or other rapid or incomplete oxidation processes involving carbon-containing fuels. The incomplete combustion products may consist of, for example, gases, solid particulates, liquids, or mixtures thereof. Incomplete combustion products typically include carbon soot, unburnt hydrocarbons, whether in particulate or in vaporous form, carbon monoxide, hydrogen gas, and the like. The term "carbon soot" is a subset of the term "incomplete combustion products" and includes unburnt and residual carbonaceous and hydrocarbon particulates.

The term "carbon-containing fuel" shall be understood to refer to any organic material that may be combusted or burned in order to generate or release energy, usually in the form of heat, light or a combination thereof. The term "fossil fuel" is a subset of "carbon-containing fuel" and includes coal, oil, natural gas, derivatives of coal, natural gas and oil, and the like. Non-fossil fuels include alcohols, fuels derived from alcohols or other fermentation products, wood, biomass and the like.

The term "operating temperature" shall refer to any temperature at which hydroxyl radicals and/or other free radicals, molecular fragments or reactive species capable of cleaning an exhaust stream generated by the combustion of a carbon-containing fuel are generated by silica and/or alumina. It is presently believed that the operating temperature may range from as low as about 30° C. to as high as perhaps about 600° C., although higher temperatures are not precluded to the extent they may be found to generate the necessary degrading atmosphere.

The term "reaction chamber" shall be broadly construed to include any apparatus capable of holding therein silica and/or alumina and that provides appropriate conditions that result in formation of the degrading atmosphere of hydroxyl radicals or other reactive fragments or species.

The terms "interact" and "interacting," in the context of the formation of hydroxyl radicals through the interaction of water and silica or alumina, shall include any chemical reaction, including surface reactions between water and silica or alumina, by which hydroxyl radicals are generated within the operating temperature.

The terms "interact", "interacting" and "interaction", in the context of the degradation or cleaning of waste exhaust gases by means of hydroxyl radicals, shall include any chemical reaction by which polluting components such as soot, hydrocarbons, CO, and oily substances are at least partially broken down or eliminated to yield a waste exhaust stream containing less pollution. It shall also refer to chemical reactions that involve the elimination or transformation of carbon dioxide into other carbon-containing compounds or substances, as well as the conversion of nitrogen oxides or other pollutants into less polluting substances.

II. Empirical Observations and Conclusions.

After starting a 1981 diesel engine having about 900,000 miles and letting it run for a time sufficient for the hot exhaust stream to pass through a bed of silica, a highly reactive environment of degrading atmosphere was formed, which appears to have migrated up the exhaust conduit, through the exhaust valves and into the combustion chamber in order to increase the combustion efficiency and reduce the incidence of soot and other pollutants. This conclusion was reached by inspection of the exhaust valve ports and valve chamber, both of which were entirely devoid of soot, even though the diesel engine had approximately 900,000 miles. This astonishing result is believed to have occurred through the formation of hydroxyl radicals by the bed of silica, which radicals aggressively attack hydrocarbon and other forms of pollution during and after combustion.

Because hydroxyl radicals are heat activated they are believed to quickly "chase" to the highest heat source which, in diesel engines, is the combustion chamber, more particularly, the cylinders. It is the belief of the inventors that the hydroxyl radicals, with their capacity to generate water when exposed to hydrocarbons, oxygenizes the highly pressurized diesel fuel within the cylinders, which then produces a much cleaner and more complete combustion of the diesel fuel. This clean, complete combustion process eliminates carbon soot, oily substances and other pollutants commonly found in diesel exhaust. It is also believed that the highly oxygenated combustion process generates supercritical water at the temperatures and pressures within the cylinders of the diesel engine. Supercritical water and hydroxyl radicals are then expelled from the combustion chamber during engine cycling where they continue to clean the length of the exhaust system.

Tom Maganas, one of the inventors, issued a purchase order in 2002 to have his 1981 Freightliner truck engine disassembled to expose the exhaust valve compartments. The diesel mechanics that performed this task were amazed at the clean, soot-free condition of the exhaust valve components. They told Mr. Maganas that they had never seen a diesel engine of any age, even a new one fresh from the factory, that looked as clean and soot-free as Mr. Maganas' 1982 Freightliner truck engine having approximately 900,000 miles.

One of the more interesting observations is that the 1981 Freightliner truck emits a huge cloud of black soot when not attached to a reactive chamber according to the invention upon startup and during hard acceleration. This is typical of both new and, especially, aging diesel engines. In contrast, when the waste exhaust stream is passed through a bed of silica, the aforementioned reactions occur such that no soot, oily substances or other such pollutants are found in the exhaust gases exiting the reaction chamber. Moreover, an examination of the bed of silica after thousands of hours of testing revealed that the sand remained virtually as clean as it was when originally input into the reaction chamber. Thus, none of the soot, oily substances or other pollutants are collecting or depositing on the sand. Moreover, as discussed above, no soot, oily substances or other pollutants are being deposited in the exhaust valve chamber or exhaust conduit. Finally, the gases that are emitted from the reaction chamber are initially virtually invisible for the first foot or two. One to two feet above the reaction chamber, however, the exhaust stream "blooms" and becomes a slightly visible light grayish cloud about five feet high which then dissipates into the atmosphere. This seems to indicate an unusually high concentration of water within the waste exhaust stream that exits the reaction chamber. Indeed, when the waste exhaust gases are passed through test equipment, a much higher than expected condensation of water is observed. Moreover, a licensed tester of the State of California measured and confirmed that the diesel engine of the Freightliner truck produced five times more water when the exhaust is passed through the bed of silica than when emitted directly into the atmosphere.

The exhaust stream, after exiting the reaction chamber, was tested and found to contain water, iron, calcium and phosphorous in that order. Such substances are believed to evidence the formation of supercritical water within the cylinders. Another theory is that "clustered water" (i.e., water with increased O—O bonding and decreased hydrogen bonding) may play some roll in the increased combustion efficiency and reduction in pollution. Clustered water is believed to exist in pentagonal dodecahedral form so as to be akin to "buckyballs" which comprise C—C bonds.

Throughout hundreds of hours of testing the 1981 Freightliner diesel truck engine using the reaction chambers according to the invention, no soot has accumulated throughout the exhaust system of the truck. Nor has any soot or oily substance been found within the reaction chamber walls or lid. All parts of the truck and reaction chamber exposed to the exhaust stream have remained absolutely free of soot and oily substances. As a result, it is reasonable to conclude that the 910,000 mile truck engine is not producing soot or oily substances. The same reasoning can be applied to the majority of pollutants that are normally associated with diesel engines. By way of background, hydroxyl radicals, as well as superheated water, are being used in various commercial industrial cleaning applications, which lends credence to the theories and conclusions contained herein.

Another unexpected and surprising result is that, while under full RPM and torque engine load, the exhaust stream leaving the exit pipe consistently measured 31% cooler than when the truck engine was subjected to the same engine conditions and load but where the exhaust stream had not passed through the bed of silica. The only reasonable conclusion is that some of the heat energy within the waste exhaust stream was being consumed by some endothermic chemical reaction involving the hydroxyl radicals, supercritical water, or other reactive moieties and the diesel fuel during combustion.

Another unexpected and surprising result is that the cleaning system continued to operate for a short time even after the engine was disconnected from the reaction chamber comprising the bed of silica. Because the interior of the exhaust conduit was coated with a shiny, reddish substance it is posited that perhaps a monolithic coating of reactive moieties is deposited or held on the interior surface of exhaust conduit in manner that allows them to temporarily continue providing their beneficial cleaning properties.

The $NO_x$, CO and $SO_2$ levels are significantly reduced below EPA requirements at all levels of engine speed. Numerous bag tests of the exhaust stream have certified very low pollution levels.

III. Systems and Methods for Cleaning Exhaust Gases.

Reference is now made to FIG. 1, which illustrates an exemplary embodiment of a cleaning system 10 adapted for use in eliminating or reducing pollutants normally produced and expelled by an internal combustion engine. The internal combustion engine may be a diesel engine 12, or may alternatively be other internal combustion engines or other devices that burn fossil fuels. Cleaning system 10 functions to degrade, clean or otherwise eliminate or reduce incomplete combustion products normally produced by an internal combustion engine. The process may be remedial and/or preventative. If remedial, the process may in some ways be similar to those provided by conventional catalytic converters, but without the need for expensive metallic catalysts, such as palladium, platinum and the like. If preventative, the process acts more like a combustion efficiency booster that eliminates or reduces formation of pollutants.

A typical diesel engine 12 comprises an air intake 14, a combustion chamber 16, and an exhaust channel 18. A turbocharger 20 may be included to compress an intake air/fuel mixture 22 that is fed into the combustion chamber 16 in order to increase the efficiency of the diesel engine 12 by supplying more combustion air initially. The turbocharger 20 is often configured to communicate with the exhaust channel 18, with the flow of exhaust gases providing force for driving the turbocharger of course, any compression means known in the art (e.g., superchargers) may be used.

Waste exhaust products 24 are discharged from the combustion chamber 16 into the exhaust channel 18. In FIG. 1, the exhaust channel 18 is depicted as providing an uninterrupted conduit that directs the waste exhaust products 24 into a reaction chamber 26. However, any appropriate means for introducing the waste exhaust products 24 into the reaction chamber 26 may be employed. Typically, waste exhaust products comprise inert nitrogen gas, carbon dioxide, water, and some oxygen gas. In conventional diesel engines, incomplete combustion products, most notably carbon soot, unburnt particulate, oily and gaseous hydrocarbons, and carbon monoxide are produced in significant quantities. Such incomplete combustion products are often visible, particularly during the acceleration phase of a diesel powered vehicle when combustion is least efficient.

The waste exhaust products 24 are introduced into the reaction chamber 26 by means of one or more diffusion pipes 28. The diffusion pipe 28 includes a plurality of holes or passages distributed therethrough which allows for a desired distribution pattern of the waste exhaust products 24 throughout the reaction chamber 26. The waste exhaust products 24 are more particularly diffused throughout catalytically reactive particles 30 located within the reaction chamber 26 as a stream comprising diffused exhaust gases 32. The catalytically reactive particles 30 comprise silica and/or alumina particles. They may also include consist essentially of silica, alumina, or mixtures thereof. The term "consist essentially of" should be understood to mean that the catalytically reactive particles mainly consist of silica, alumina or mixtures thereof, but they may include minor quantities of impurities such as metals and ash typically found in silica and/or alumina.

It is believed that the silica and/or alumina, when properly activated in the presence of sufficient heat and moisture, produce a degrading atmosphere of highly reactive hydroxyl radicals, and possibly other reactive species or molecular fragments, that are able to remedially degrade and clean a variety of pollutants found in a waste exhaust stream generated by the burning of carbon-containing fuels. Surprisingly, remediation of soot and oily substances within the exhaust valve ports and valve chamber of a 20-year old diesel engine has been observed, as well as the prevention of new soot or oily deposits. This observation suggests that perhaps the degrading atmosphere is somehow preventing the formation of soot and oily substances during combustion so that the effect is prophylactic or preventative instead of remedial. There is some evidence that may suggest that supercritical water may have some role in reducing or eliminating the formation of pollutants within the combustion chamber.

Whereas the silica and/or alumina are believed to be responsible for the formation of a degrading atmosphere that includes abundant hydroxyl radicals such that expensive catalysts such as palladium and platinum are not necessary, inclusion of such materials would be within the scope of the present invention so long as the silica and/or alumina are "activated" and able to produce the degrading atmosphere.

In some cases the catalytically reactive particles 30 may become at least partially "fluidized," at least locally where the waste exhaust gases are introduced into the bed or layer of particles. In other words, at least a portion of the particles may become elevated and/or slightly separated, at least locally, by rising gases such that they may not always be in a state of natural particle packing density. Fluidizing or elevating the particles leaves them in a much less compacted state. This fluidized, separated or elevated state yields particles having a surface area that is more accessible and available for contact with the diffused exhaust gases 32 rising through the particles 30. Increased surface contact with the diffused exhaust gases 32 is believed to increase the ability of the reactive particles 30 to generate the degrading atmosphere. Ultimately, the treated exhaust gases 34 exit the reaction chamber 26 by means of an outlet or stack 36. The use of the term "treated exhaust gases 34" should not construe to mean that treatment of exhaust gases occurs solely or even primarily, within the confines of the reaction chamber 26. In fact, some or all of such treatment appears to occur upstream at or near to location of combustion.

As stated above, the catalytically reactive particles 30 may be in a fluidized or suspended state, which might increase their available surface area and ability to catalytically react with the diffused exhaust gases 32 to create the degrading atmosphere. In some cases, the waste exhaust products 24 themselves may have sufficient pressure to cause the catalytically reactive particles 30 to at least partially or locally become fluidized, separated, or suspended. However, in the case where the waste exhaust products 24 have insufficient pressure to cause fluidization or levitation of the catalytically reactive particles 30 if desired, it may be desirable to increase the pressure of the waste exhaust products 24 prior to their being introduced into the reaction chamber 26. This may be done by means of a compressor 38 or other compressing means known in the art. In many cases the pressure of the waste exhaust products 24 will depend on the rate at which the diesel engine is consuming diesel fuel and will typically correspond to the number of RPMs at which the engine is running. At higher RPMs the exhaust gases will typically have adequate pressure to cause at least partial fluidization of the catalytically reactive particles 30. However, at lower RPMs the waste exhaust products 24 be pressurized if desired.

An information feed-back mechanism (not shown) may be utilized to determine whether or not the compressor 38 needs to be activated at any particular point in time as well as the degree of pressurization to be imparted to the waste exhaust products 24. One of ordinary skill in the art will be able to adjust the amount of compression imparted by the compressor 38 depending on the requirements of the overall cleaning system 10.

Waste exhaust products 24 typically leave the diesel engine 12 at temperatures of about 400° C. to about 550° C. However, the waste exhaust products 24 typically begin to cool after leaving the diesel engine 12 and after passing through the exhaust channel 18. In order to preserve heat generated by the diesel engine 12, it may be desirable to position the reaction chamber 26 in relation to the diesel engine 12 so that the waste exhaust products 24 do not cool to temperatures below the preferred operating temperature of the cleaning system 10. In addition, various insulating means known in the art may be utilized in order to preserve a desired amount of the heat produced by burning fuel within the diesel engine 12 and found within the waste exhaust products 24 as they leave combustion chamber 16.

In the event that it is desired to increase the temperature of the waste exhaust products 24, an auxiliary heater 40 may be used to increase the temperature of the waste exhaust products 24 prior to their entering into the reaction chamber 26. In addition, the auxiliary heater 40 may optionally be configured so as to provide moisture as needed to maintain the reactivity of the catalytically reactive particles. Nevertheless, the waste exhaust products 24 will themselves generally provide moisture in the form of combustion water produced by the oxidation of hydrocarbons.

In alternative embodiments, the fluidization of the catalytically reactive particles 30 may be carried out by means of an auxiliary input system (see FIG. 3, items numbers 104–120) which act independently of the force of the waste exhaust products 24 being introduced into the reaction chamber 26 through the diffusion pipe(s) 28. In addition, auxiliary heating means (see FIG. 3, item number 88) located within the reaction chamber 26 may be used in order to maintain the reaction chamber 26 at a desired operating temperature, particularly at start up when the diesel engine is cold and the waste exhaust products 24 are too low to maintain the reaction chamber 26 at the desired temperature. Finally, in the event that the waste exhaust gases are too hot such that their temperature is higher than the desired operating temperature of the reaction chamber 26, it may be desirable to provide cooling means (not shown) in order to maintain the waste exhaust products 24 at a desired temperature.

In general, it is currently believed that the "operating temperature" (i.e., the temperature at which the catalytic particles are able to produce a degrading atmosphere of highly reactive hydroxyl radicals and other reactive species) may be as low as about 30° C. and as high as about 600° C., preferably in a range of about 50° C. to about 500° C., more preferably in a range of about 75° C. to about 450° C., and most preferably in a range of about 100° C. to about 400° C.

It may be advantageous to select catalytically reactive particles 30 that have a relatively high specific surface area. It is believed that it is at the surface of the particles 30 where the reactive hydroxyl radicals or other reactive species or molecular fragments are generated. Accordingly, increasing the surface area of the particles 30 without increasing their weight allows for the use of a lower mass of reactive particles 30 while maintaining a desired level of reactivity of the cleaning system 10. Reduced weight is particularly desirable in the event that the reaction chamber 26 is installed in and carried by a moving vehicle.

Figure 2:
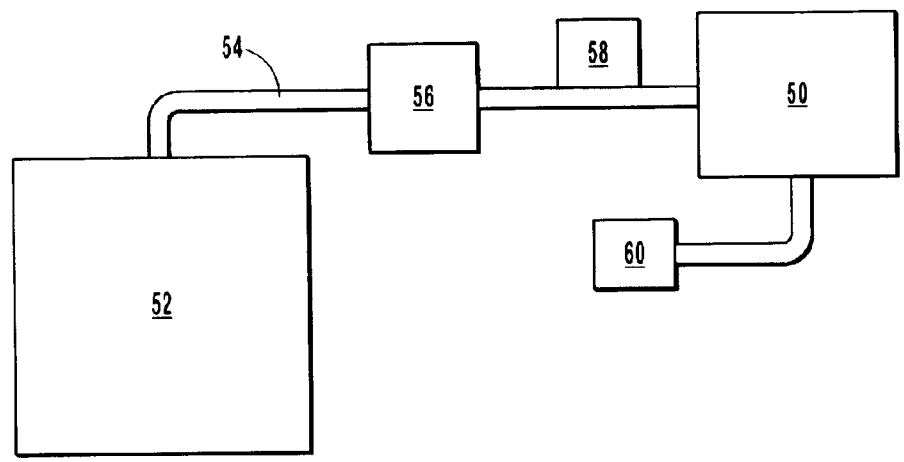
FIG. 2 is a schematic view of a reaction chamber used in combination with an exhaust flue of an industrial burner.

The catalytic systems according to the present invention can be modified, such as by upscaling or downscaling, to degrade and clean virtually any waste exhaust stream that includes incomplete combustion products of a carbon-containing fuel. For example, FIG. 2 is a schematic diagram depicting a reaction chamber 50 upsized and configured for use in degrading and cleaning incomplete combustion products produced by an industrial burner 52 or other device that relies on the combustion of a carbon-containing fuel. Such industrial burners 52 commonly burn coal, coke, fuel oil, natural gas, or derivatives of coal, petroleum or natural gas, all of which are capable of generating incomplete combustion products such as soot, unburnt or partially burnt hydrocarbons, and carbon monoxide. Industrial burners 52 are utilized in a wide range of industrial operations, such a power generation, metal smelting, manufacturing, and the like.

Exhaust gases produced by the industrial burner 52 are carried from the burner 52 to the reaction chamber 50 by means of an exhaust conduit or channel 54. A compressor 56 may be used to ensure that the exhaust gases produced by the industrial burner 52 are fed into reaction chamber 50 with adequate pressure. An in-line introducer of auxiliary inputs 58 may be used in order to ensure adequate heat and/or moisture content of the exhaust gases before they are introduced into the reaction chamber 50. In addition, or alternatively, heat and/or moisture may be introduced by means of an off-line or parallel introducer of auxiliary inputs 60 connected separately to the reaction chamber 50. Introducer 60 may also be used to independently fluidize, separate, or at least partially suspend the catalytically reactive particles of silica or alumina located within the reaction chamber 50.

Figure 3:
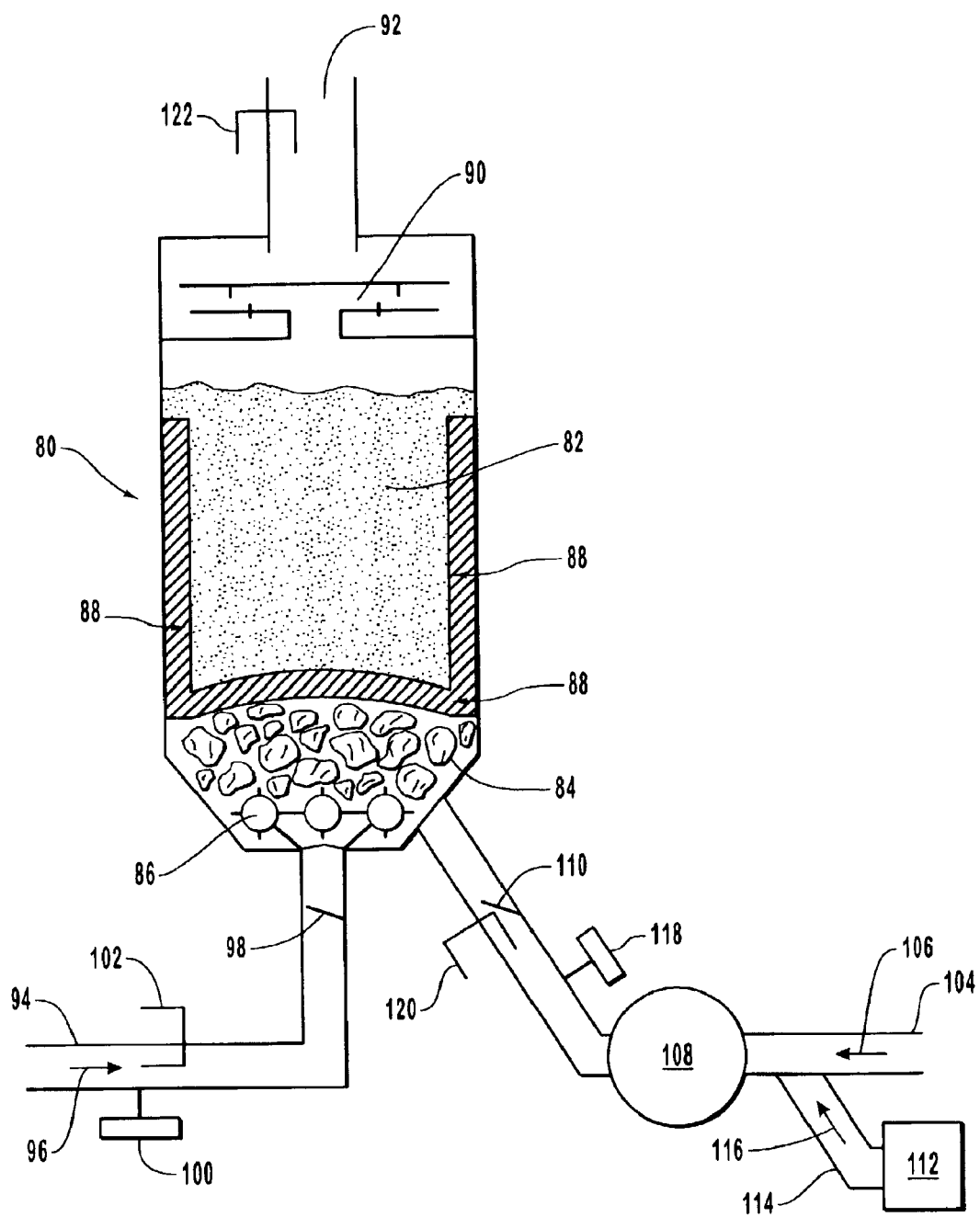
FIG. 3 is a cross-section view of an alternative embodiment of a reactive chamber according to the invention.

In order to illustrate another embodiment of a cleaning system according to the present invention, reference is now made to FIG. 3. Depicted therein is a reaction chamber 80 that includes therein catalytically reactive particles 82 comprising silica, alumina or a combination thereof. The bed of catalytically reactive particles 82 sits atop a bed of rocks 84 surrounding porous introduction tubes 86 in order to more evenly distribute waste exhaust gases emitted by the porous diffusion tubes 86 and into the catalytically reactive particles 82. An optional auxiliary heating element 88 that provides resistive heat is shown disposed around the inner circumference of the reaction chamber 80 in order to provide additional heat if needed during operation of the reaction chamber 80. Exhaust gases 96 that passed through the particles 82 may be removed from the reaction chamber 80 by passing them through a cyclone filter 90 to remove particulates and out an exhaust stack 92.

Exhaust gases 96 are introduced into the reaction chamber 80 by means of an exhaust channel 94 communicating between reaction chamber 80 and an internal combustion engine (not shown), such as a diesel engine or some other source of waste gases, such as an industrial burner. The exhaust channel 94 may further be equipped with an anti-backflow trap 98 in order to ensure essentially one-way flow of exhaust gases 96 into the reaction chamber 80. The exhaust channel 94 may optionally be equipped with a pressure tube 100 for measuring the pressure of the exhaust gases 96. A Pitot tube 102 may also be employed to measure the velocity of the exhaust gases 96.

In order to assist the exhaust gases 96 in heating, and/or fluidizing the catalytically reactive particles 82 within the reaction chamber 80, an auxiliary air input system may be employed. Such an auxiliary input system preferably includes an air input channel 104 through which air 106 can be introduced into the reaction chamber 80. The air is compressed and accelerated by means of an air turbine 108.

An anti-backflow trap 110 may be used to ensure one-way flow of air 106 into the reaction chamber 80 and in order to prevent unwanted escape of exhaust gases 96 through the air input channel 104.

A heating unit 112 may also be employed for introducing heated air into air input channel 104. A heated air channel 114 communicating between the heating unit 112 and air input channel 104 directs heated air 116 into air channel 104. An optional pressure tube 118 may be used to measure pressure, while an auxiliary Pitot tube 120 may be used to measure the velocity, of the air 106 being input into the reaction chamber 80. Finally, a Pitot tube 122 may be used within the exhaust stack 92 in order to measure the velocity of the treated exhaust gases exiting the exhaust stack 92.

Figure 4:
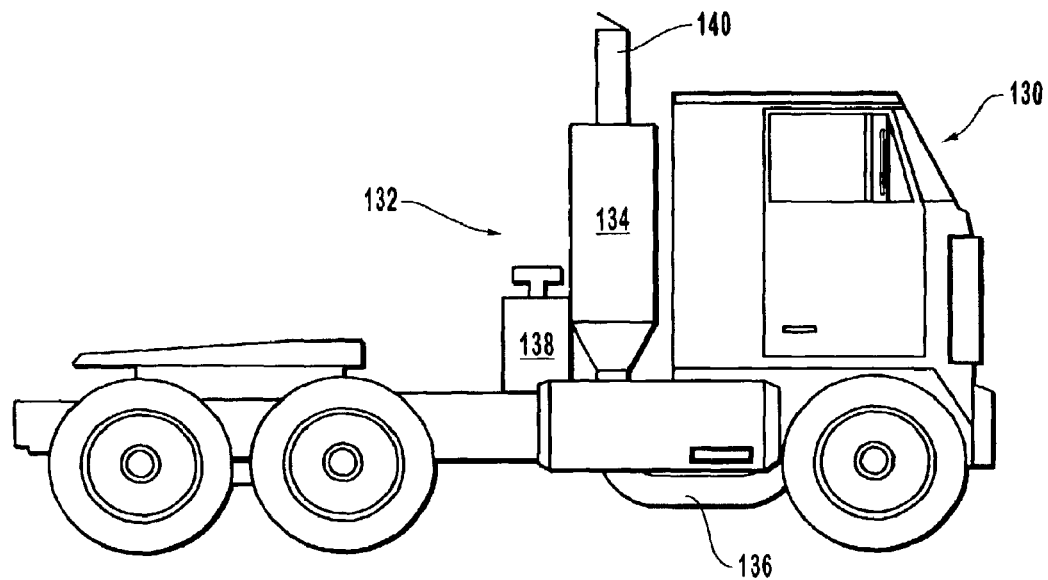
FIG. 4 is a partial cross-section view of a reaction chamber sized and configured for use with a diesel-powered tractor-trailer rig.

FIG. 4 depicts a diesel tractor trailer 130 equipped with a catalytic system 132, more particularly a reaction chamber 134, sized and configured for convenient use with the tractor-trailer 130. Exhaust gases from the tractor-trailer are introduced into the reaction chamber 134 by means of an exhaust channel 136. A turbine 138 may be used to introduce additional air into the reaction chamber 134 in order to increase or provide fluidization of the catalytically reactive particles located therein. In addition, or alternatively, the turbine 138 may be used to increase the pressure of the exhaust gases themselves before being introduced into the reaction chamber 134. The treated exhaust gases are expelled from the reaction chamber 134 through an exhaust stack 140.

Figure 5:
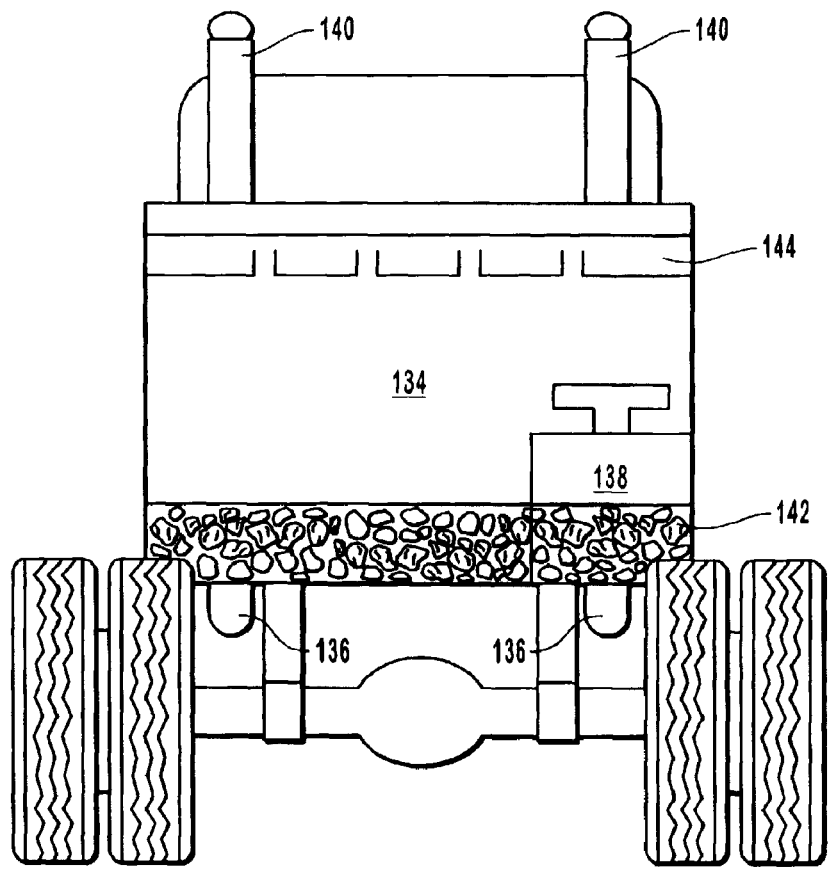
FIG. 5 is a rear cross-section view of a reaction chamber configured to approximate the width of a diesel-powered tractor-trailer rig.

FIG. 5 is a rear view of the catalytic system 132 depicted in FIG. 4 showing a reaction chamber 134 can be sized, if desired, to occupy substantially the entire width of the tractor trailer 130. FIG. 5 further depicts a bed of rocks 142 used to assist the distribution of waste exhaust gases throughout the reaction chamber 134, as well as cyclone filters 144 through which the treated exhaust gases may pass before escaping through the exhaust stacks 140.

Figure 6:
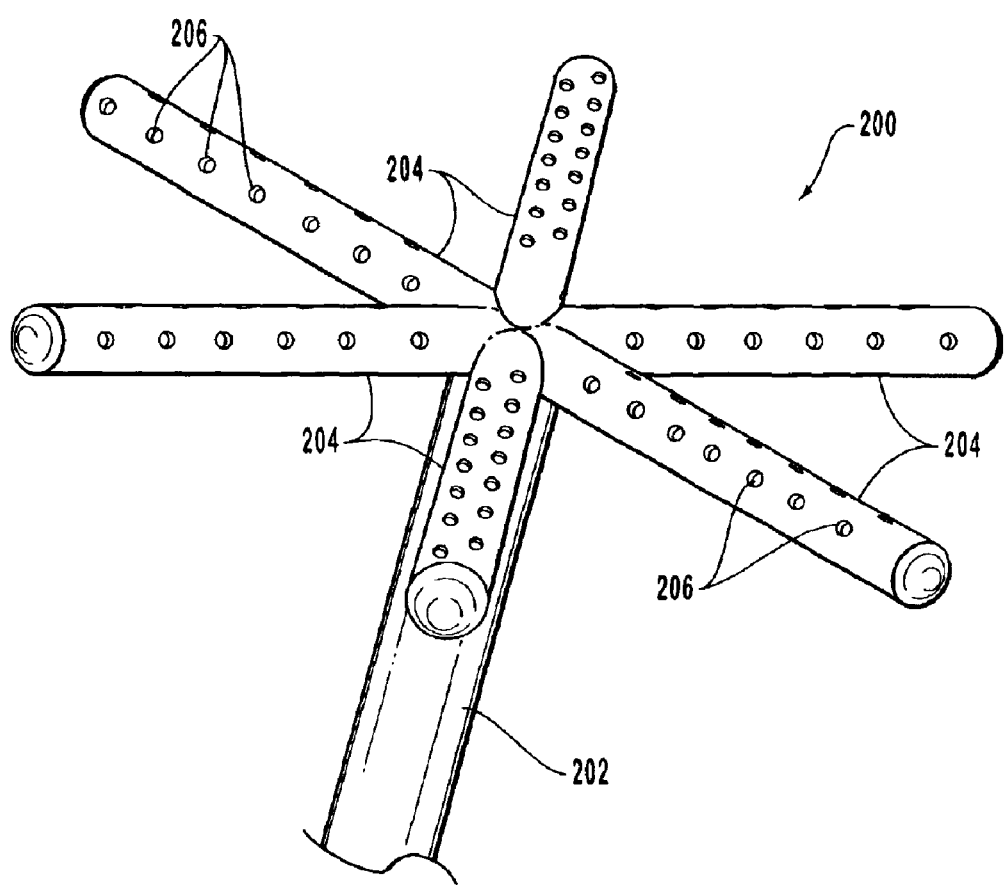
FIG. 6 is a perspective view of a radial diffusion pipe for inputting waste exhaust gases into a reaction chamber according to the invention.
Figure 7:
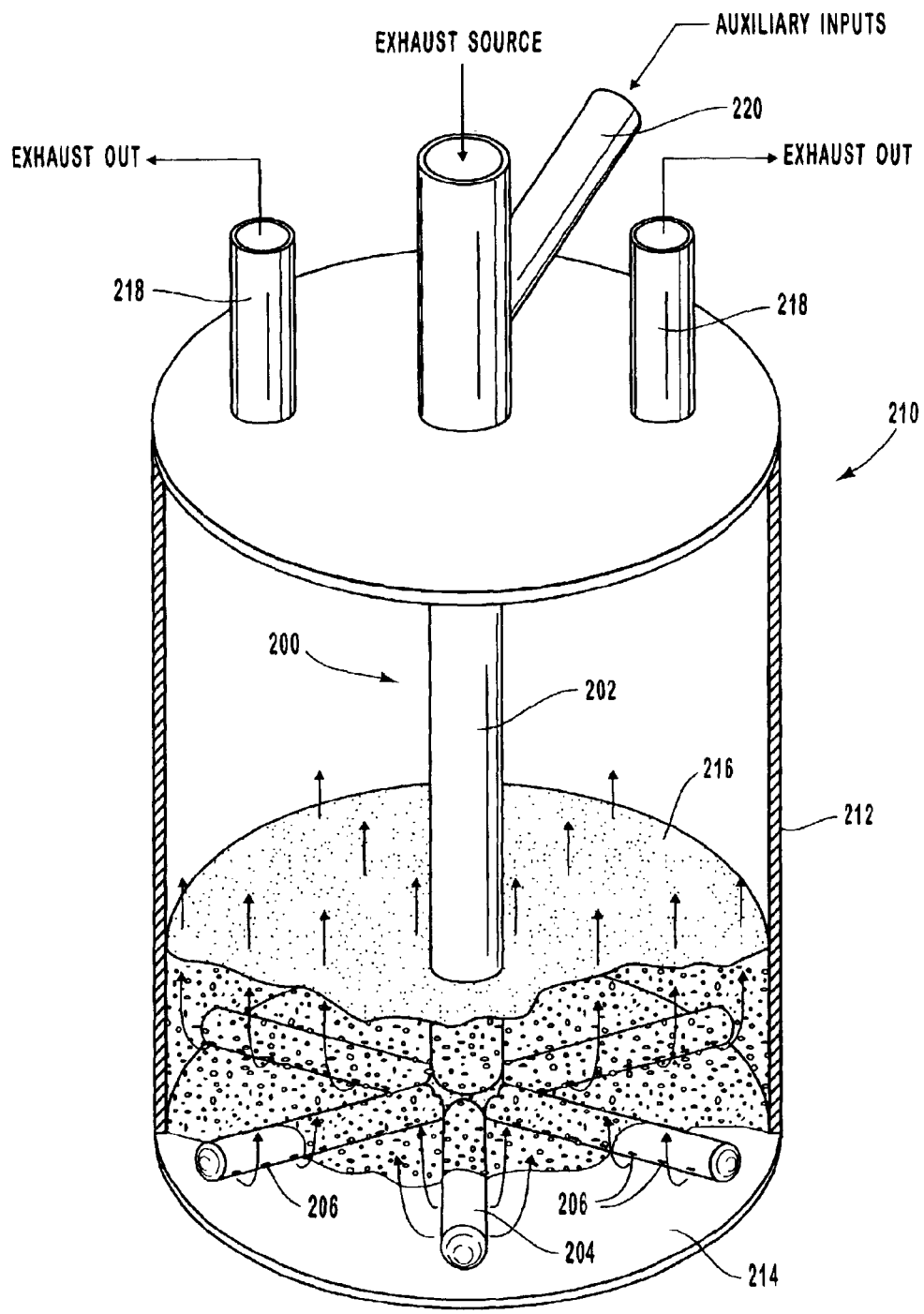
FIG. 7 is cut-away perspective view of the radial diffusion pipe of FIG. 6 within a reaction chamber according to the invention.

FIG. 6 depicts a diffusion system 200 according to the present invention that may be used to diffuse waste exhaust gases generated by an internal combustion car engine within an appropriately sized and shaped reaction chamber (FIG. 7). The diffusion system 200 more particularly includes a central pipe 202 in gaseous communication with an internal combustion engine. A plurality of diffusion tubes 204 in gaseous communication with the central pipe 202 distribute the gases evenly throughout the bed of silica and/or alumina particles, more particularly by means of diffusion holes 206. In the case where the inner base or bottom of the reaction chamber is planar, the diffusion tubes 204 may advantageously be oriented perpendicular to the central pipe 202 and radiate in a spoke-like fashion in order to best diffuse the gases through the bed of reactive particles. In the case where the bottom of the reaction chamber is angled (e.g., a cone) or curved (e.g., in the form of a curved basin), the diffusion tubes 204 may advantageously conform to the shape of the reaction chamber bottom. The diffusion tubes 204 are submerged below or within the bed f silica, and/or alumina particles.

In one actual working embodiment, the central pipe 202 had an inner diameter of 2 inches, the diffusion tubes 204 had an inner diameter of 1 inch, and the diffusion holes had a diameter of between 0.097 and 0.100 inch. The central pipe 202 was 5 feet long, and each diffusion tube 204 extended 7 inches from the central pipe 202. Each diffusion tube 204 included 7 pairs of holes located on either side of the bottom of each tube 204, with each pair of holes being separated by a radial distance of about 80° (i.e., each hole was offset from a central point (e.g., the bottom of the pipe when in use) by a radial distance of about 40°. The central pipe 202 and diffusion tubes 204 were made of iron.

FIG. 7 depicts a cleaning system 210 according to the invention, which includes a cylindrical reaction chamber 212 in combination with diffusion system 200. The reaction chamber 212 includes a substantially flat bottom 214 which supports a bed of silica or alumina particles 216. The diffusion tubes 204 are preferably buried beneath or otherwise surrounded by the bed of catalytically reactive particles 216 when in use. The exhaust gases enter the reaction chamber 212 through diffusion holes 206, pass through the bed of reactive particles 216, and exit the reaction chamber 212 through exit conduits 218. Auxiliary inputs, such as moisture, heat, oxygen and the like, may be input into the reaction chamber 212 through auxiliary input channel 220.

In order to maximize the ability of the waste exhaust gases to contact and at least partially elevate or suspend the reactive particles during operation of the reaction chamber, the diffusion holes 206 may be oriented so as direct the gases toward the bottom of the reaction chamber. Thus, the diffusion holes 206 will advantageously be oriented on or within an underside of each diffusion tube 204.

In addition to generating the degrading atmosphere of hydroxy radicals or other species, the surrounding particles 216 may also act to efficiently dampen sounds and disperse sound waves contained within a stream of exhaust gases from an internal combustion engine, e.g., a diesel engine. Indeed, it has been found that muffling may occur while maintaining substantially lower back pressure compared to conventional muffling systems. Although some back pressure may be desirable or necessary, reducing excess back pressure within the exhaust system will typically increase both fuel efficiency and power.

In order to prevent backflow of the silica or other particles within the reaction chamber into the exhaust system, the diffusion system 200 may advantageously feed the waste exhaust gases through the top of the reaction chamber, or at least at some point that is higher than the level of the silica particles.

Figure 8:
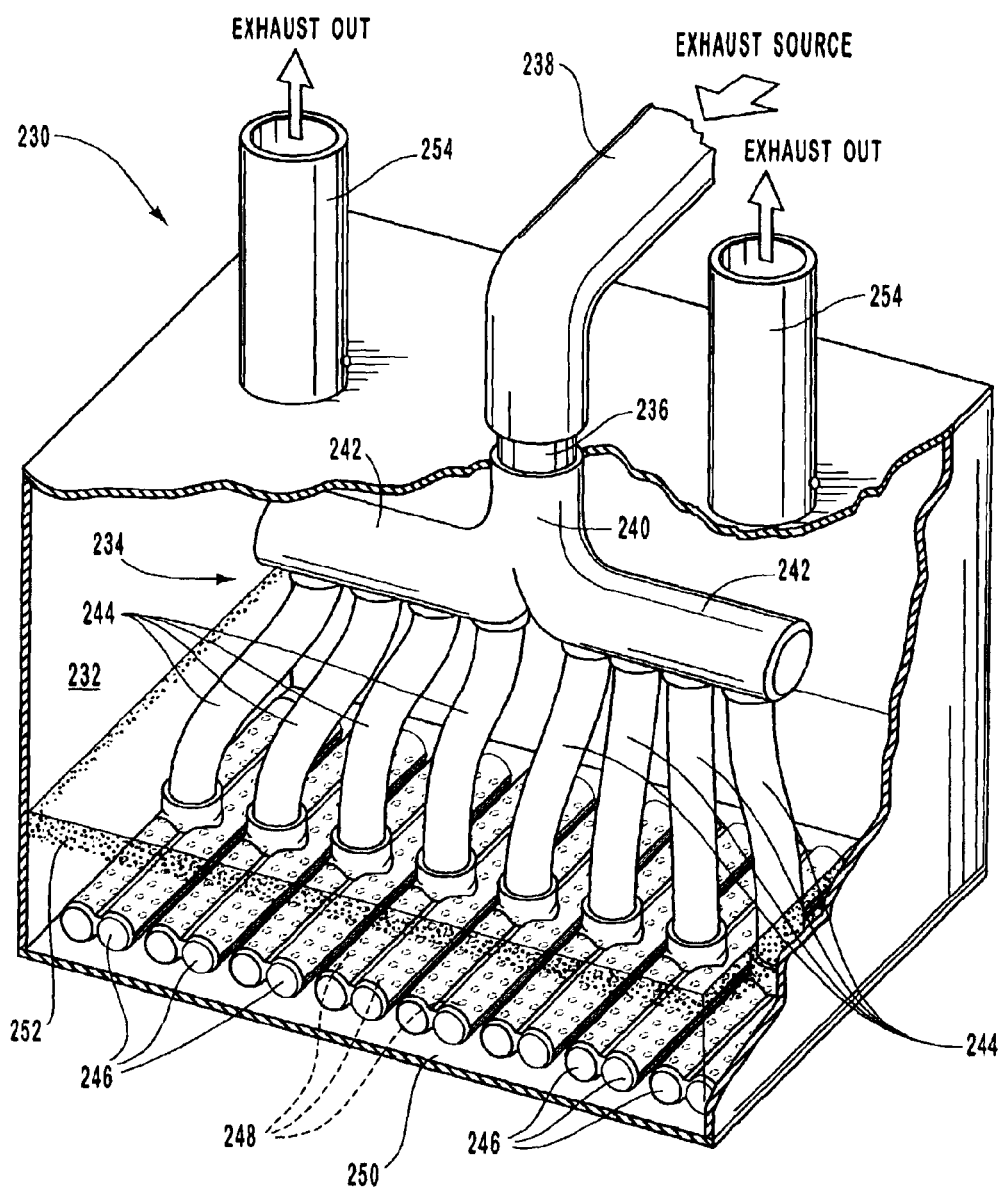
FIG. 8 is cut-away perspective view of a gas diffusion system according to the invention for diffusing gases within a reaction chamber of the invention.

Reference is now made to FIG. 8, which illustrates a cleaning system 230 that includes a reaction chamber 232, together with a more elaborate diffusion system 234 according to the invention. Diffusion system 234 was created in order to increase the flow of exhaust gases and reduce back pressure on the exhaust system of a 15 liter diesel engine of a diesel tractor used to pull a conventional trailer in a tractor-trailer combination.

Diffusion system 234 includes an input pipe 236 that receives waste exhaust gases from a diesel engine (not shown) or other source of waste exhaust gases generated by combusting a carbon-containing fuel. The waste exhaust gases may be delivered to input pipe 236 by means of a flexible or rigid hose 238. In communication with the input pipe 236 is a manifold 240 comprising a pair of manifold pipes 242 that extend away from each other. In communication with each manifold pipe 242 are a plurality of feeder pipes 244 (e.g., 4), which in turn communicate with a plurality (e.g., 2) of diffusion pipes 246. Each diffusion pipe 246 further includes a plurality of diffusion holes 248 oriented within an underside of each diffusion pipe 246 for directing exhaust gases toward the bottom 250 of the reaction chamber 232.

When in operation, the waste exhaust gases are delivered to the input pipe 236 of the diffusion system 243 by hose 238. The gases pass into the manifold 240, and into the feeder pipes 244 via the manifold pipes 242. The feeder pipes in turn deliver the gases to the diffusion tubes 246, which direct the gases toward the bottom 250 of the reaction chamber 232 via diffusion holes 248. The gases rise through a bed 252 of reactive particles, causing the particles to become at least partially fluidized or suspended, at least locally near the diffusion holes 248. Finally, the treated exhaust gases exit the reaction chamber 232 via exhaust portals 254.

The exemplary diffusion system 234 depicted in FIG. 8 includes a single input pipe 236, a pair of manifold pipes 242, a total of eight feeder pipes 244, and a total of sixteen diffusion tubes 246. As such, the diffusion system 234 forms a generally rectangular structure capable of fitting within a reaction chamber, such as reaction chamber 232, having a generally rectangular cross section. It should be understood, however, that the diffusion system 234 may be modified as desired to accommodate other sizes and shapes of reaction chambers.

In one working embodiment, the input pipe 236 had an inner diameter of 5 inches, the manifold pipes 242 each had an inner diameter of 5 inches, the feeder pipes 244 had an inner diameter of 2 inches, the diffusion tubes 246 had an inner diameter of 1 inch, and the diffusion holes had a diameter of between 0.100 and 0.125 inch. The holes were each offset 40° from the bottom of diffusion pipes 246. The input pipe 236, manifold pipes 242, feeder pipes 244, and diffusion tubes 246 were made of iron.

Figure 9:
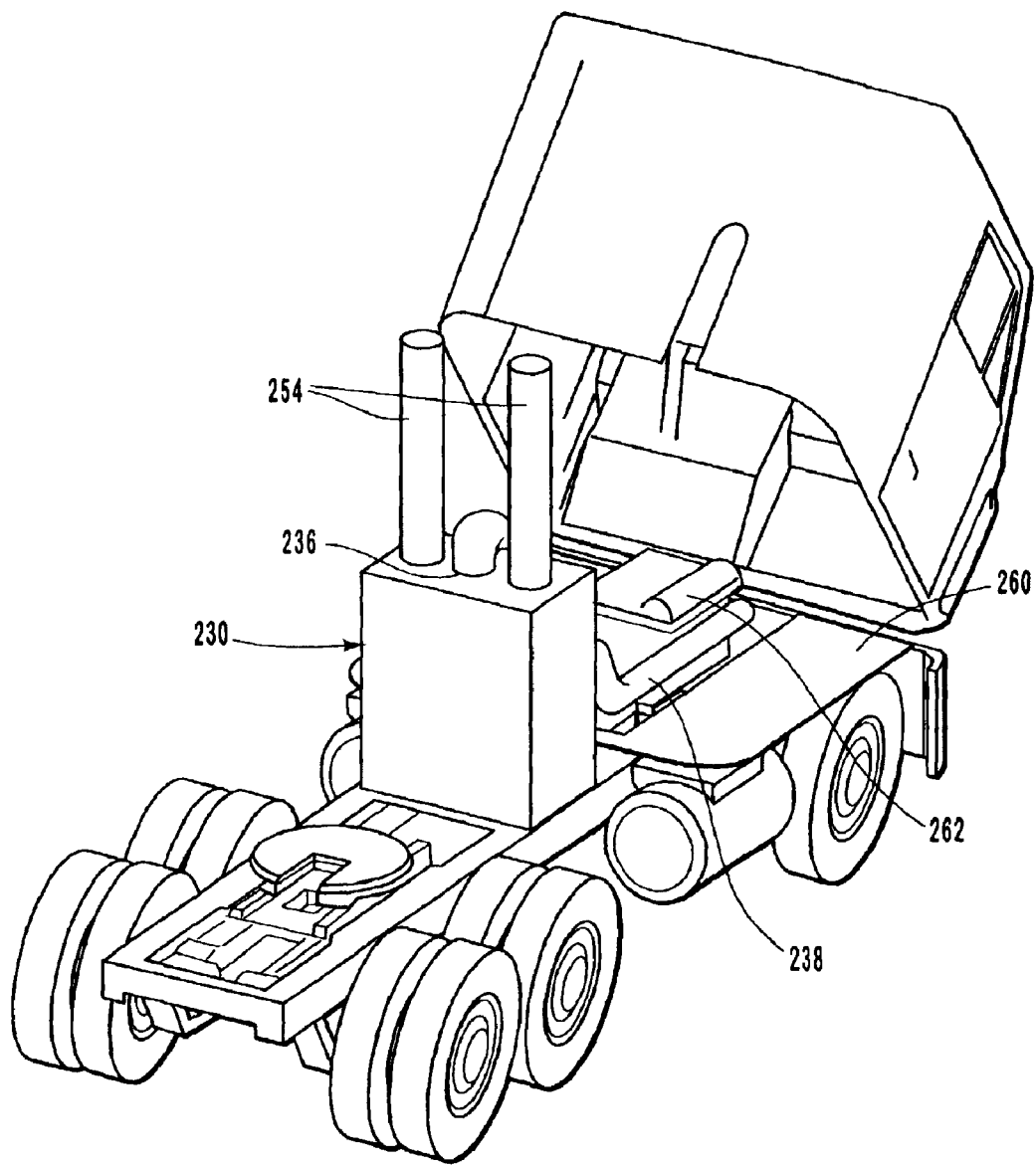
FIG. 9 depicts an inventive reaction chamber mounted on a diesel-powered truck.

FIG. 9 depicts a reaction chamber 230 mounted on a diesel tractor 260. An exhaust or pipe 238 channel 224 feeds exhaust gases generated by a diesel engine 262 into input pipe 236 that is, in turn, connected to a diffusion system (not shown) that introduces the gases within a bed of silica or other appropriate particulate system (not shown) capable of forming a degrading atmosphere of hydroxyl radicals. The treated exhaust gases exit the reaction chamber through one or more exhaust pipes 280.

III. Test Data

To date, numerous tests utilizing the inventive cleaning methods and systems, as well as precursor methods and systems that led up to the present methods and systems. Illustrative tests that demonstrate the veracity of the theories expressed herein, as well as the efficacy of the inventive methods and systems, and will now be discussed in more detail.

Test 1

A reaction chamber similar to the one depicted in FIG. 3 and which included silica sand as the catalytically reactive media was adapted for use with a diesel engine. The diesel engine that was utilized for this experiment included a pair of exhaust pipes at the rear of the vehicle. A pair of rubber hoses were attached to the respective pair of exhaust pipes and joined together in a Y union to form a single exhaust conduit leading to the underside of the reaction chamber. A heating/compressor unit was also used in conjunction with the reaction chamber in order to introduce heated air under pressure into the reaction chamber as needed in order to provide a fluidized bed of silica sand heated to a temperature in a range from about 200° C. to about 375° C. In addition, a series of tubes configured and arranged so as to sample untreated exhaust gases as well as treated exhaust gases were interfaced with various analytical devices in order to test the level of waste products in the exhaust gases both before and after treatment by the reaction chamber.

In order to establish a benchmark for how much degradation and cleaning of the exhaust gases was being carried out by the reaction chamber, untreated exhaust gases were fed through a draw tube and caused to pass through a filter paper for a period of ten minutes in order to trap waste exhaust particulates, i.e. soot. After 10 minutes the filter paper was removed and inspected. A very noticeable buildup of black carbon soot was found on the filter paper.

Thereafter, exhaust gases that were treated by means of the reaction chamber were fed into a draw tube and caused to pass through a filter paper for a period of 10 minutes. Subsequent inspection of the filter paper revealed a remarkable drop in the level of soot that was collected, perhaps up to 95% or more. Whereas the untreated exhaust gases caused a build up of black soot on the filter paper that was easily transferred to a person's fingers, the treated exhaust yielded a faintly gray build up of material that did not easily rub off. Whereas these respective buildups of soot were not quantified a visual inspection showed a drop of at least 75–95% of soot compared to the untreated exhaust.

In addition, the level of carbon monoxide was measured both before and after treatment with the reaction chamber and found to be reduced by about 90%. This indicated that the catalytically reactive media particles were able to catalytically oxidize, or otherwise eliminate, carbon monoxide in a short period of time as the waste exhaust gases rose through the catalytically reactive silica particles.

In addition, the level of nitrogen oxides ($NO_x$) was measured both before and after treatment with the reaction chamber and were also found to be reduced by about 90%. This indicated that the catalytically reactive media particles were able to catalytically eliminate nitrogen oxides in a short period of time as the waste exhaust gases rose through the catalytically reactive silica particles. They were most likely reformed into silicon nitride. Alternatively, they may have been reduced to nitrogen gas as the carbon, carbon monoxide and hydrocarbons were oxidized to carbon dioxide.

This experiment was repeated numerous times and each time there was a noticeable drop in the level of carbon soot, carbon monoxide and nitrogen oxides as a result of passing the waste exhaust gases through the reaction chamber. This demonstrated that the silica particles are catalytically reactive since merely passing a stream of exhaust gases through an inert bed would not be expected to cause further degradation or cleaning of any incomplete combustion products found therein. The dramatic increase in the rate and extent of elimination of the incomplete combustion products strongly indicates the catalytic capabilities of silica sand relative to waste exhaust gases.

Through subsequent experiments it was found that about 100 pounds of silica sand is adequate to catalytically degrade up to 95% of the incomplete combustion products produced by a diesel engine having a displacement of 400 cubic inches. Moreover, it was found that the silica sand did not degrade but could be used almost indefinitely without being depleted. Of course, in the event that the reaction chamber needs to be recharged with silica sand, it can be done so at very low cost. Sand is a very inexpensive commodity compared to conventional catalysts.

Test 2

Further experiments were carried out using the apparatus described in Example 3, except that the silica sand was not fluidized as much but was kept in only a slightly elevated state. Furthermore, after the diesel engine was warmed up all auxiliary heat was cut off such that the only heat input into the reaction chamber was provided by the diesel engine exhaust. A series of measurements indicated that the temperature leveled off and remained at about 180° C. The treated exhaust gases were sampled and found to be virtually emission free. In particular, the filter paper used to sample particulates from the treated gases remained virtually clean over time (i e. after sampling for more than 10 minutes), which indicated that over 99% of the particulates were being degraded and eliminated without any additional heat inputs.

Thereafter, large filter paper was placed over the opening of the exhaust stack itself for at least 10 minutes to ensure that the sampling techniques used above were not flawed in some way. The large filter paper was examined and appeared to be virtually clean, which indicated that virtually no particulates were passing through the reaction chamber and into the atmosphere. In short, simply passing waste exhaust gases through a slightly fluidized bed of ordinary silica sand resulted in the virtual elimination of all waste particulates found in diesel engine exhaust. This test confirms that ordinary silica sand can behave as a powerful catalyst in catalytically oxidizing, or otherwise degrading, incomplete combustion products of diesel fuel at temperatures as low as about 180° C. without the use of expensive conventional catalysts.

Test 3

A reaction chamber containing silica is used to remove up to 98% of the soot and other unburnt carbonaceous materials emitted in the flue gas from an industrial burner that utilizes coal or fuel oil. Carbon monoxide and nitrogen oxides are also greatly reduced. Because the industrial plant is stationary, and because silica is extremely inexpensive, an amount of silica appropriate for oxidizing the unburnt components from the industrial burners is used. The temperature is maintained within a range from about 30° C. to about 500° C. by appropriate means, and the moisture content of the gases within the reaction chamber is maintained by appropriate means, such as by, e.g., a humidifier.

Test 4

A reaction chamber containing a fluidized bed of silica was used to catalyze the incomplete combustion products from a 1990 Geo Metro having approximately 125,000 miles. A conventional emission tester was used to determine the hydrocarbon and carbon monoxide levels both before and after passing the exhaust through the inventive reaction chamber. The 1990 Geo Metro was equipped with a factory-installed catalytic converter, which was left in place to determine if the inventive reaction chamber would further remove unburnt gases and particulates produced by a gasoline-powered engine but not catalytically oxidized by the catalytic converter.

Normal levels of hydrocarbons and carbon monoxide were measured by inserting the sampling pipe into the exhaust pipe of the Geo Metro, which is the standard practice. While running at a speed of 2338 RPMs and no load the Geo Metro was tested for emissions. The hydrocarbon level was determined to be 1412 ppm, while the concentration of CO was detected as 0.29%.

Thereafter, the exhaust stream was diverted and passed directly through the reaction chamber. In order to prevent dilution of the exhaust gases all external sources of air flow, such as heated air inputs, were curtailed. Only the exhaust gases from the Geo Metro were introduced into the reaction chamber during the testing procedure. After correcting for dilution, the hydrocarbon level was determined to be only 22 ppm, while the concentration of CO was measured as 0.00%. This means that the reaction chamber of the invention reduced the hydrocarbon level by about 98.5% while removing virtually all of the CO, or over 99% of the CO. The foregoing test demonstrated that the inventive methods and systems were better able to remove CO and unburnt hydrocarbons more efficiently and completely than standard catalytic converters.

Test 5

A reaction chamber containing a fluidized bed of silica was used to catalyze the incomplete combustion products from a 1984 STD Mercedes Benz Diesel. A conventional emission tester was used to determine the hydrocarbon and carbon monoxide levels both before and after passing the exhaust through the inventive reaction chamber. The 1984 STD Mercedes Benz Diesel had no catalytic converter since they are not used with diesel engines due to their ineffectiveness.

Normal levels of hydrocarbons and carbon monoxide were measured by inserting the sampling pipe into the exhaust pipe of the Mercedes Benz Diesel, which is the standard practice. While running at a speed of at least about 2000 RPMs and no load the Mercedes Benz Diesel was tested for emissions. The hydrocarbon level was determined to be 219 ppm, while the concentration of CO was detected as 2.02%.

Thereafter, the exhaust stream was diverted and passed directly through the reaction chamber. In order to prevent dilution of the exhaust gases all external sources of air flow, such as heated air inputs, were curtailed. Only the exhaust gases from the Mercedes Benz Diesel were introduced into the reaction chamber during the testing procedure. After correcting for dilution, the hydrocarbon level was determined to be 0 ppm, while the concentration of CO was measured as 0.01%. This means that the reaction chamber of the invention reduced virtually all of the hydrocarbons, or over 99%, while removing about 99.5% of the CO.

Test 6

The reaction chamber and silica bed that had been repeatedly and extensively used to waste exhaust gases from the Mercedes Benz Diesel described in Test 5 was examined. The interior wall of the reaction chamber, as well as the exhaust conduit leading out of the reaction chamber, both of which comprised stainless steel, were completely clean and free of soot, oils and other substances found in diesel exhaust. This indicates that the soot, oils and other waste products were degraded and cleaned before they had a chance to deposit on the reaction chamber walls and exhaust conduit.

Various samples of the silica bed, which was about 2 inches deep during normal operation, were examined macroscopically and under a microscope. No traces of soot, oils or other substances normally found in diesel exhaust were detected, indicating that the bed of silica is reactive and does not merely act as a filter or depositing substrate for the waste products found in the diesel exhaust. It also indicates that the silica bed was very efficient in degrading and cleaning the pollutants found in the exhaust gases since they did not collect in the silica faster than they were destroyed.

A diffusion system similar to the one illustrated in FIG. 6 was used to introduce waste exhaust gases into the reaction chamber. The diffusion system was examined by visual external examination and, later, by being cut apart, to identify the location of the sooty and oily deposits from the waste exhaust gases in an effort to understand more about the manner in which the incomplete combustion products are actually destroyed or cleaned. Visual external examination of the diffusion pipes indicated that the diffusion holes were completely clean and free of soot, oils or other substances normally found in diesel exhaust. It also appeared that the area within the diffusion pipes immediately surrounding the diffusion holes was also clean. This seemed to indicate that degradation and cleaning of the waste exhaust gases was possibly commenced even before the gases actually entered the reaction chamber and contacted, or diffused between, the silica particles.

The central pipe that fed the waste exhaust gases to the various diffusion pipes, which was 5 feet long, was separated from the diffusion pipes and cut apart in various locations. To the surprise of the inventors, the interior surface of each diffusion pipe was entirely clean and free from soot and oily substances. Moreover, only a portion of the central pipe interior surface was coated with soot and oily substances found in diesel exhaust. The central pipe was entirely clean and free from sooty and oily deposits from the point where it intersected with the diffusion pipes up to approximately 3 feet above this intersection. On the other hand, the first 2 feet of the central pipe contained heavy deposits of oily soot on the interior surface. Moreover, the change from clean to dirty was abrupt rather than gradual, which seems to rule out the idea that the exhaust gases simply became cleaner as they traveled through the diffusion system as a result of surface deposition.

The only substance found within the diffusion pipes and the clean 3 foot portion of the central pipe was a thin coating of an orangeish crystalline material that was essentially tasteless and which had the appearance of a glassy or glass-like material. It is speculated that this material includes a form of silicon, such as silicon carbide or nitride. A glassy substance was also found on the surface of rocks that were placed in the reaction chamber beneath the bed of silica, further providing evidence that deposition of some form of silicon or other glassy substance is occurring in connection with the removal of soot and other incomplete combustion products. A number of metallic items, such as a machine screw and a short length of steel wire were discovered in the bottom of the reaction chamber. They were coated with the same glossy substance. They were placed in ocean water for two weeks but showed no indication of rusting or corroding. Both items were highly resistant to cracking and checking normally associated with extremely hard surface coatings.

This startling discovery indicates the degrading atmosphere generated within the reaction chamber is apparently somehow able to migrate partially up into the gas diffusion system such that the degradation of the waste exhaust gases actually occurs, or at least begins, in the gas diffusion system rather than merely within the reaction chamber itself and in the immediate vicinity of the silica particles. Why this occurs is surprising since the hydroxyl radicals and/or other reactive moieties seem to have traveled countercurrent to the flow of exhaust gases. Perhaps some sort of highly charged region of excited electrons is created, perhaps through an interaction between the silica particles, hydroxyls and iron pipes, that are at least partially responsible for breaking down the pollutants.

Test 7

Waste exhaust gases produced by a Geo Metro were found to contain 0.90% $CO_2$ and 17.30% oxygen gas ($O_2$). After treating the exhaust gases using a reaction chamber according to the invention, the treated gases were found to contain a reduced amount of $CO_2$ (virtually none) and an increased amount of $O_2$ (20.1%). This seems to indicate that the inventive methods and systems are able to somehow reduce $CO_2$ while generating $O_2$.

Test 8

Waste exhaust gases produced by a Mercedes Benz diesel engine were found to contain 13.90% $CO_2$ and 2.90% $O_2$. After treating the exhaust gases using a reaction chamber according to the invention, the treated gases were found to contain a reduced amount of $CO_2$ (between 0.40% and 2.70%) and an increased amount of $O_2$ (between 16.90% and 20.50%). This appears to confirm that the inventive methods and systems are able to reduce $CO_2$ and generate $O_2$.

Test 9

A reaction chamber similar to the one depicted in FIG. 8 was used to treat exhaust gases generated by a 1981 diesel engine, namely a diesel manufactured by Caterpillar, Inc. identified as a 3406A diesel engine mounted on a Freightliner tractor trailer. The tractor trailer had about 900,000 miles of recorded use and the Caterpillar diesel engine was the original engine such that it also had about 900,000 miles. Extremely old engines having 900,000 miles generally produce more pollution and are less efficient than newer engines. Nevertheless, the apparatus according to the invention resulted in far less pollutants actually emitted into the atmosphere by the old diesel engine. Repeated testing showed that the waste exhaust stream from the Caterpillar diesel engine passed through the inventive apparatus contained far less hydrocarbons, virtually no soot and other pollutants normally found in the exhaust from diesel engines.

Although it was previously suspected that some of the reaction in remediating the pollution may have occurred at or inside of the diffusion holes rather than solely within the reaction chamber, subsequent inspections revealed that there was no soot or any oily deposits anywhere within the diffusion pipes, the conduit leading from the diesel engine to the diffusion pipes, and even the exhaust valve ports. This was truly a surprising and unexpected result, which can seemingly be explained by assuming that the degrading atmosphere of hydroxyl radicals created by the reaction chamber somehow migrates countercurrent to the flow of exhaust and causes or results in more complete combustion of the diesel fuel within the cylinders themselves (i.e., at the point of combustion). Otherwise, one would observe the typical build ups of soot and oily substances in the exhaust manifold. Moreover, the degrading atmosphere apparently remediated whatever soot and oily substances previously existed within the exhaust manifold of the aging diesel engine prior to hooking it to the inventive reaction system.

One theory as to how combustion efficiency is increased is that the degrading atmosphere comprising hydroxyls or other reactive species interacts with the gasses within the cylinder before or during combustion, thereby resulting in more complete combustion. It is believed that hydroxyl radicals or similar species increase the combustion efficiency. Another theory posits that hydroxyl radicals, under conditions of high heat and compression found within the cylinder of a diesel engine, reacts with the hydrocarbon fuel so as to yield supercritical water as an intermediate reactant that is able to increase the combustion efficiency. Truly inexplicable is the fact that the waste exhaust stream contained less carbon dioxide than would otherwise be expected, even if complete normal combustion occurred. More testing may be required to ascertain the exact nature of what is occurring during combustion.

During one of the tests carried out by the inventors, the reaction chamber was located near a white van, and the treated gases were aimed horizontally at the white van. A light grayish substance became deposited on the van wall. Fortunately, this somewhat wet substance could easily and cleanly be removed. Also, on the small section that was initially removed, the light greyish substance did not appear to include any soot since it did not streak upon removal. In addition, after the testing period was concluded the van wall was exposed for over six hours to 90° F. plus temperature in direct sunlight. Surprisingly, the light grayish substance proved to be extremely resistant to evaporation in the hot sun and still remained somewhat wet. It also wiped off streak free just as easy as on the earlier removal. Based on this observation, one of the inventors concluded that the substance at one point contained or was formed by supercritical water and/or water clusters. Further testing might shed additional light as to the chemical mechanism by which the inventive apparatus and methods actually work.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for increasing combustion efficiency during combustion of a carbon-containing fuel, comprising:
   step for producing exhaust gases through combustion of a carbon-containing fuel;
   step for generating a degrading atmosphere of hydroxyl radicals by means of an interaction between said exhaust gases, water, and at least one of silica or alumina; and
   step for increasing efficiency of said combustion of said carbon-containing fuel by said degrading atmosphere.

2. A method as defined in claim 1, wherein the step for producing exhaust gases is performed by at least one of an internal combustion engine or an industrial burner.

3. A method as defined in claim 2, wherein the step for producing exhaust gases includes burning a fossil fuel.

4. A method as defined in claim 1, wherein the step for producing exhaust gases includes burning a fuel selected from the group consisting of fermentation products, derivatives of fermentation products, wood, and biomass.

5. A method as defined in claim 1, wherein the step for generating a degrading atmosphere of hydroxyl radicals is carried out within a reaction chamber including therein a bed of particles consisting essentially of at least one of silica or alumina particles.

6. A method as defined in claim 5, wherein said bed of particles is at least partially or locally fluidized or suspended.

7. A method as defined in claim 5, wherein the step for generating a degrading atmosphere comprises introducing said exhaust gases into said reaction chamber by means of at least one diffusion pipe including at least diffusion hole submerged within or beneath said bed of particles.

8. A method as defined in claim 7, wherein the step for increasing efficiency of said combustion of the carbon-containing fuel is at least partially carried out at or near where said combustion occurs.

9. A method as defined in claim 8, wherein the step for increasing efficiency of said combustion of the carbon-containing fuel occurs within one or more cylinders of an internal combustion engine.

10. An apparatus comprising means for carrying out the method defined in claim 7.

11. A method as defined in claim 1, wherein the step for generating the degrading atmosphere is carried out at a temperature in a range of about 30° C. to about 600° C.

12. A method as defined in claim 1, wherein the step for generating the degrading atmosphere of hydroxyl radicals is carried out at a temperature in a range of about 50° C. to about 500° C.

13. A method as defined in claim 1, wherein the step for generating the degrading atmosphere of hydroxyl radicals is carried out at a temperature in a range of about 75° C. to about 450° C.

14. A method as defined in claim 1, wherein the step for generating the degrading atmosphere of hydroxyl radicals is carried out at a temperature in a range of about 100° C. to about 400° C.

15. A method as defined in claim 1, wherein the step for increasing efficiency of combustion of the carbon-containing fuel involves at least partial elimination of at least one incomplete combustion product of a carbon-containing fuel, said at least one incomplete combustion product being selected from the group consisting of carbon-containing particulates, soot, hydrocarbons, oily substances, hydrogen gas, and carbon monoxide.

16. A method as defined in claim 1, wherein the step for increasing efficiency of combustion comprises at least partially eliminating carbon dioxide produced during combustion of said carbon-containing fuel.

17. A method as defined in claim 1, wherein the step for increasing efficiency of combustion comprises at least partially eliminating at least one of NOx and $SO_2$ produced during combustion of said carbon-containing fuel.

18. A method as defined in claim 1, wherein said hydroxyl radicals migrate toward a combustion chamber where the combustion of said carbon-containing fuel occurs.

19. A method as defined in claim 18, wherein supercritical water is formed within said combustion chamber.

20. A method as defined in claim 18, wherein said combustion chamber comprises one or more cylinders of an internal combustion engine.

21. A method as defined in claim 20, wherein said internal combustion engine is a diesel engine.

22. A method as defined in claim 1, wherein the step for producing exhaust gases is performed by a turbocharged diesel engine.

23. An apparatus comprising means for carrying out the method defined in claim 22.

24. A method for increasing combustion efficiency during operation of a diesel engine comprising:
   producing exhaust gases through combustion of diesel fuel by a diesel engine, said exhaust gases containing water;
   generating a degrading atmosphere by interacting said exhaust gases and water contained therein with at least one of silica or alumina and then allowing said exhaust gases that have interacted with said at least one of silica or alumina to pass through an outlet into the atmosphere for as long as said diesel engine continues to run; and
   causing or allowing at least a portion of said degrading atmosphere to migrate to at or near where said combustion occurs in order to thereby increase combustion efficiency of said diesel fuel and at least partially eliminate at least a portion of at least one combustion product of said diesel fuel selected from the group consisting of carbon-containing particulates, soot, hydrocarbons, oily substances, carbon monoxide, and carbon dioxide.

25. A method as defined in claim 24, wherein said degrading atmosphere comprises hydroxyl radicals.

26. A method as defined in claim 25, wherein said hydroxyl radicals migrate toward one or more cylinders of said diesel engine where said combustion of said diesel fuel occurs.

27. A method as defined in claim 26, wherein supercritical water is formed within said one or more cylinders.

28. An apparatus comprising means for carrying out the method defined in claim 24.

29. An apparatus as defined in claim 24, wherein the apparatus comprises a diesel engine in gaseous communication with a turbocharger, a reaction chamber containing said at least one of silica or alumina, an exhaust conduit interconnecting said diesel engine and said reaction chamber and configured so as to ensure that at least a portion of said exhaust gases produced by said diesel engine are introduced into said reaction chamber for so long as said diesel engine continues to run, and an exhaust outlet in communication with said reaction chamber and configured so as to ensure that said exhaust gases introduced into said reaction chamber are vented into the atmosphere for as long as said diesel engine continues to run.

30. A method as defined in claim 24, wherein said exhaust gases are produced by a turbocharged diesel engine, wherein said exhaust gases are introduced into a chamber containing said at least one of silica or alumina.

31. A system for increasing combustion efficiency during operation of a diesel engine, comprising:

a diesel engine that produces exhaust gases through combustion of diesel fuel;

a reaction chamber;

at least one of alumina or silica particles contained within said reaction chamber;

an exhaust conduit interconnecting said diesel engine and said reaction chamber and configured so as to ensure that at least a portion of the exhaust gases produced by said diesel engine are introduced into said reaction chamber for as long as said diesel engine continues to run; and an outlet in communication with said reaction chamber and configured so as to ensure that the exhaust gases introduced into said reaction chamber are allowed to exit the reaction chamber into the atmosphere for as long as said diesel engine continues to run, wherein a degrading atmosphere is generated by interacting said exhaust gases with said at least one of silica or alumina for as long as said diesel engine continues to run, and wherein at least a portion of said degrading atmosphere migrates to one or more cylinders of said diesel engine in order to thereby increase combustion efficiency of said diesel fuel within said one or more cylinders by at least partially eliminating at least a portion of at least one combustion product of the carbon-containing fuel selected from the group consisting of carbon-containing particulates, soot, hydrocarbons, oily substances, carbon monoxide, and carbon dioxide.

\* \* \* \* \*

UNITED STATES PATENT AND TRADEMARK OFFICE
CERTIFICATE OF CORRECTION

PATENT NO. : 6,962,681 B2
DATED : November 8, 2005
INVENTOR(S) : Maganas et al.

It is certified that error appears in the above-identified patent and that said Letters Patent is hereby corrected as shown below:

Title page,
Item [63], Related U.S. Application Data, change "Feb. 28, 1999," to -- Feb. 25, 1999, --.
Item [56], References Cited, FOREIGN PATENT DOCUMENTS, change "FR   2687785 Al" to -- FR   2687765 Al --.
OTHER PUBLICATIONS,
change "Schafey et al.," to -- Shafey et al., --.

Column 4,
Line 41, after "reaction chamber" remove "containing".

Column 5,
Line 10, before "water vapor," insert -- as --.

Column 6,
Line 13, change "understand," to -- understood, --.
Line 18, before "play a role" insert -- may --.

Column 8,
Line 16, after "shall refer" insert -- to --.

Column 10,
Line 62, before "exhaust conduit" insert -- the --.
Line 62, after "conduit" change "in manner" to -- in a manner --.

Column 11,
Line 27, change "turbocharger of" to -- turbocharger. Of --.
Line 56, after "may also" remove "include".

Column 12,
Line 41, after "at or near to" insert -- the --.
Line 63, after "products 24" insert -- may --.

Column 14,
Line 13, change "such a" to -- such as --.

UNITED STATES PATENT AND TRADEMARK OFFICE
CERTIFICATE OF CORRECTION

PATENT NO. : 6,962,681 B2
DATED : November 8, 2005
INVENTOR(S) : Maganas et al.

It is certified that error appears in the above-identified patent and that said Letters Patent is hereby corrected as shown below:

Column 15,
Line 30, after "chamber 134" insert -- that --.
Line 56, change "bed f silica," to -- bed of silica, --.

Column 16,
Line 64, after "diffusion system" change "243" to -- 234 --.

Column 17,
Line 28, after "pipe 238" remove "channel 224".
Line 35, change "exhaust pipes 280." to -- exhaust pipes 254. --.
Line 39, after "systems" insert -- , have been performed --.

Column 20,
Line 39, before "waste exhaust gases" insert -- treat --.

Column 22,
Line 29, after "diesel engine" insert -- that --.

Column 23,
Line 60, before "diffusion hole" insert -- one --.

Signed and Sealed this

Second Day of May, 2006

JON W. DUDAS
*Director of the United States Patent and Trademark Office*